F. L. CONE.
AUTOMATIC SCREW MACHINE.
APPLICATION FILED AUG. 15, 1917.

1,271,540.

Patented July 9, 1918.
12 SHEETS—SHEET 1.

Fig. 1.

Inventor
Frank L. Cone
by [signature]
Attorneys

F. L. CONE.
AUTOMATIC SCREW MACHINE.
APPLICATION FILED AUG. 15, 1917.

1,271,540.

Patented July 9, 1918.
12 SHEETS—SHEET 2.

Inventor
Frank L. Cone
by  Attorneys

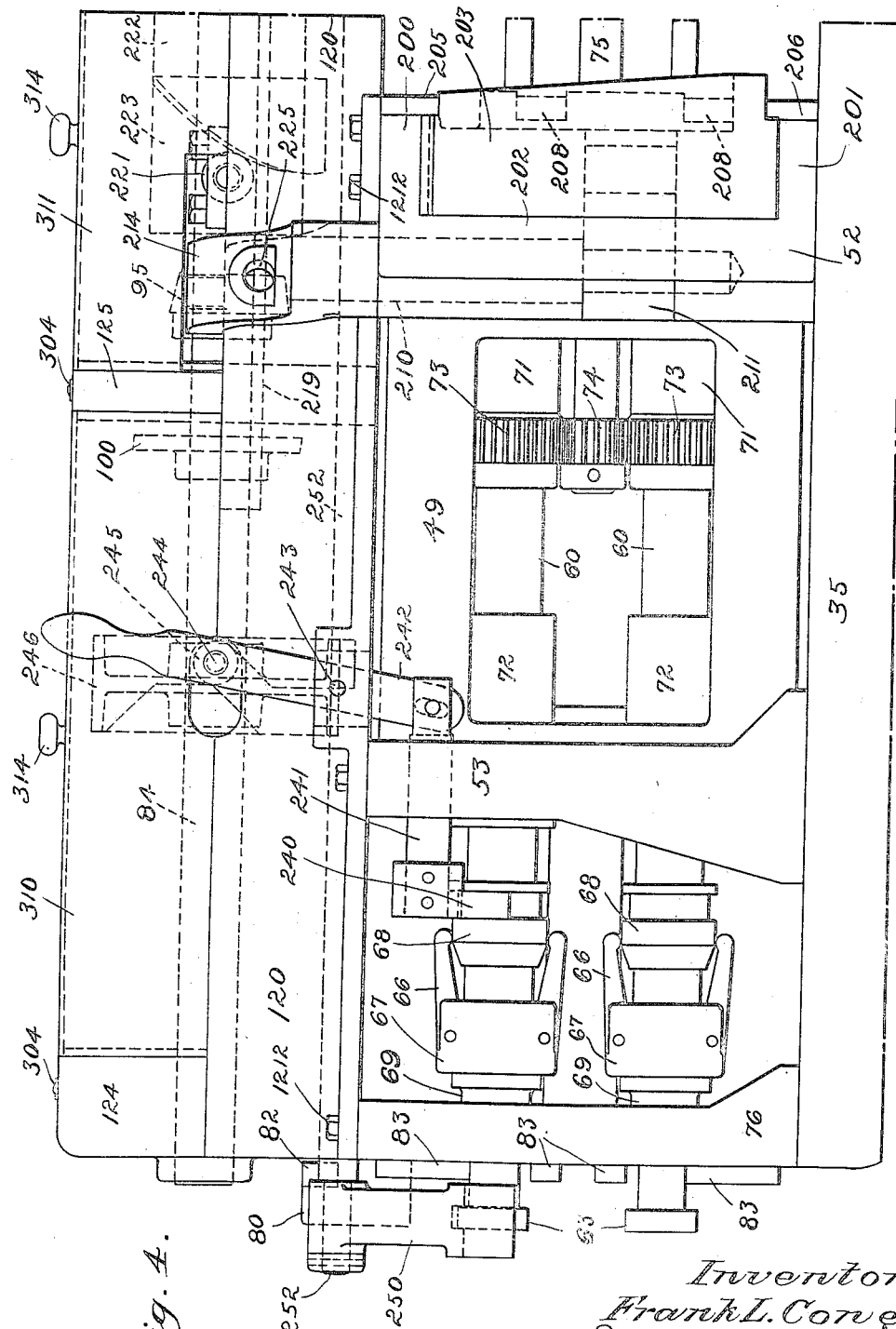

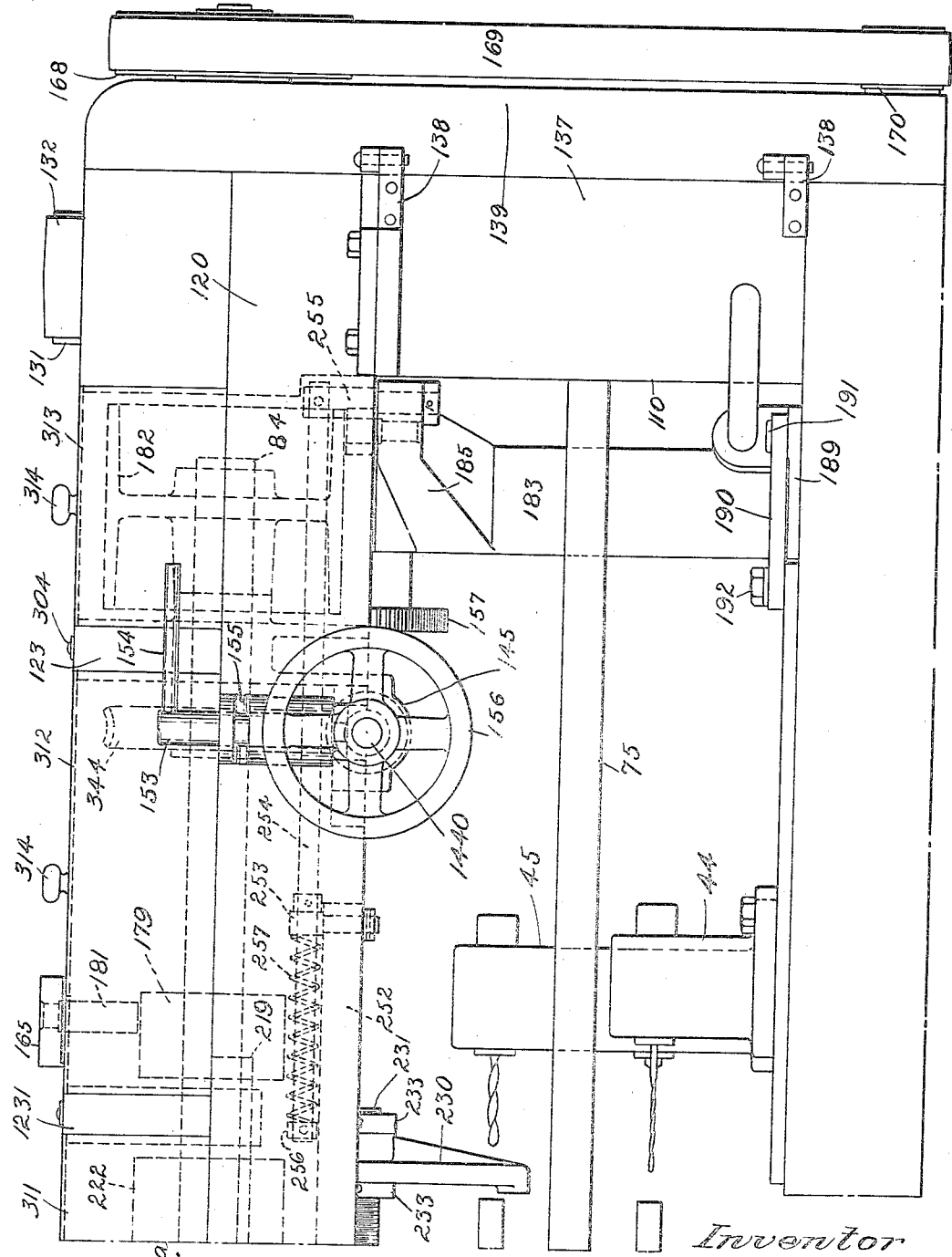

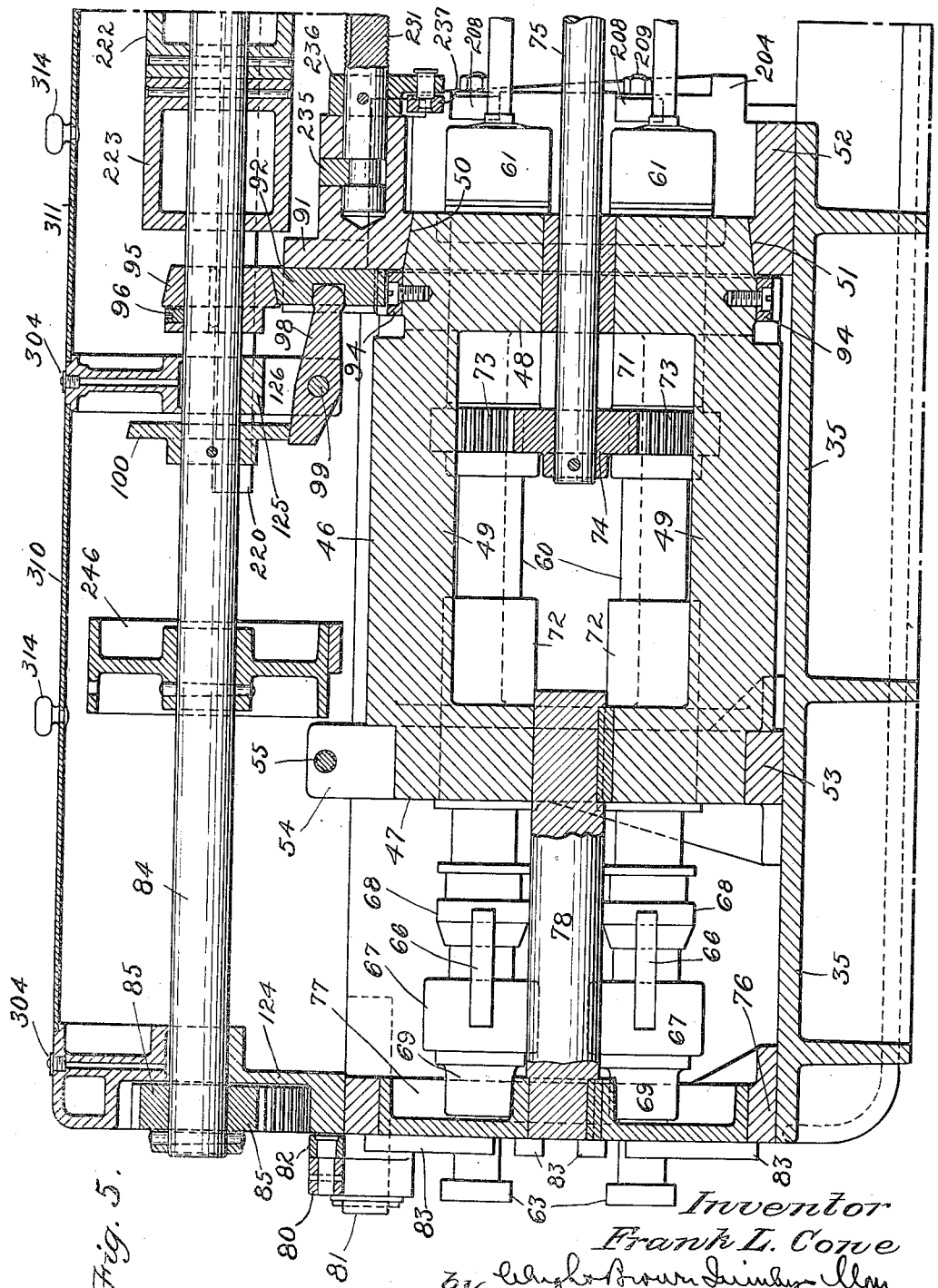

F. L. CONE.
AUTOMATIC SCREW MACHINE.
APPLICATION FILED AUG. 15, 1917.
1,271,540.
Patented July 9, 1918.
12 SHEETS—SHEET 6.
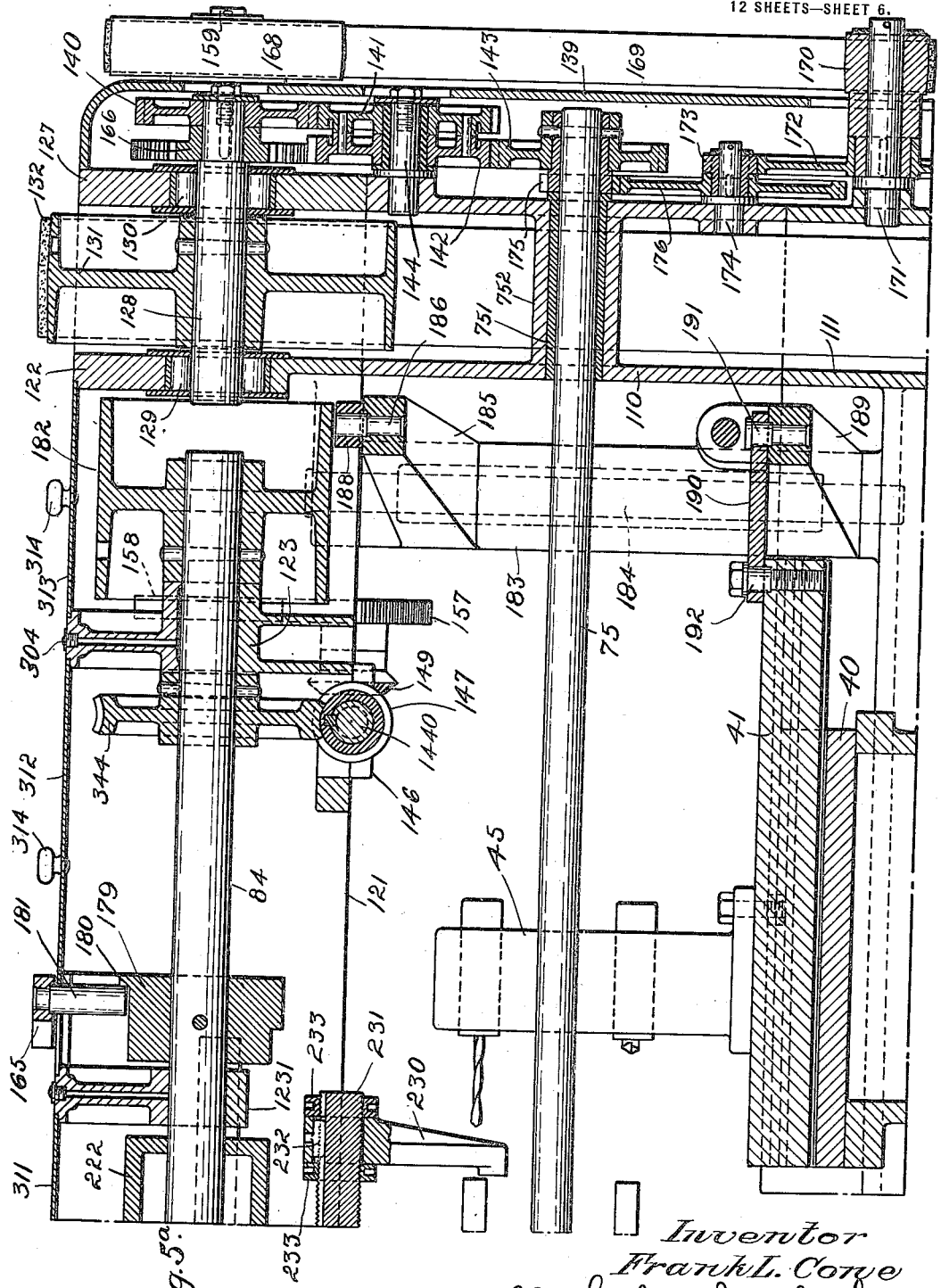
Fig. 5ª.
Inventor
Frank L. Cone
by [signature]
Attorneys

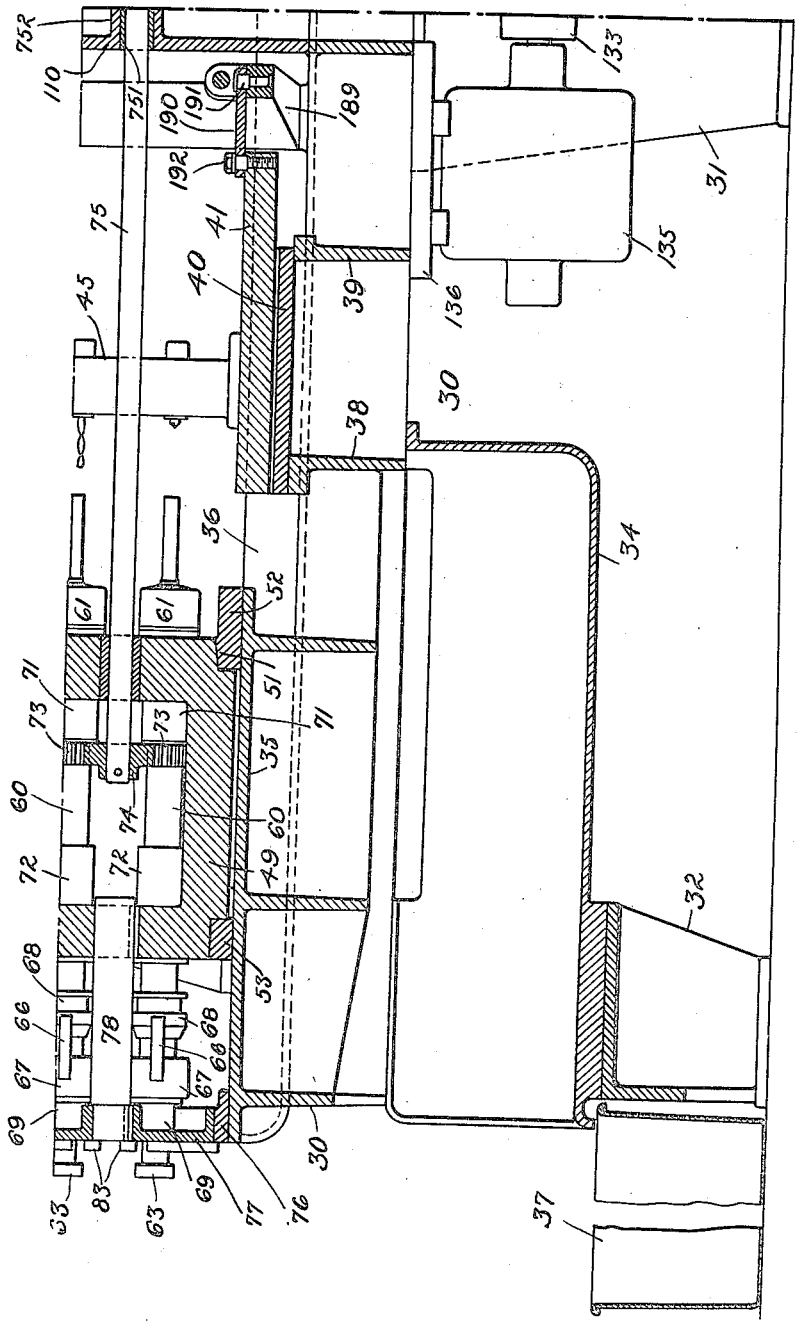

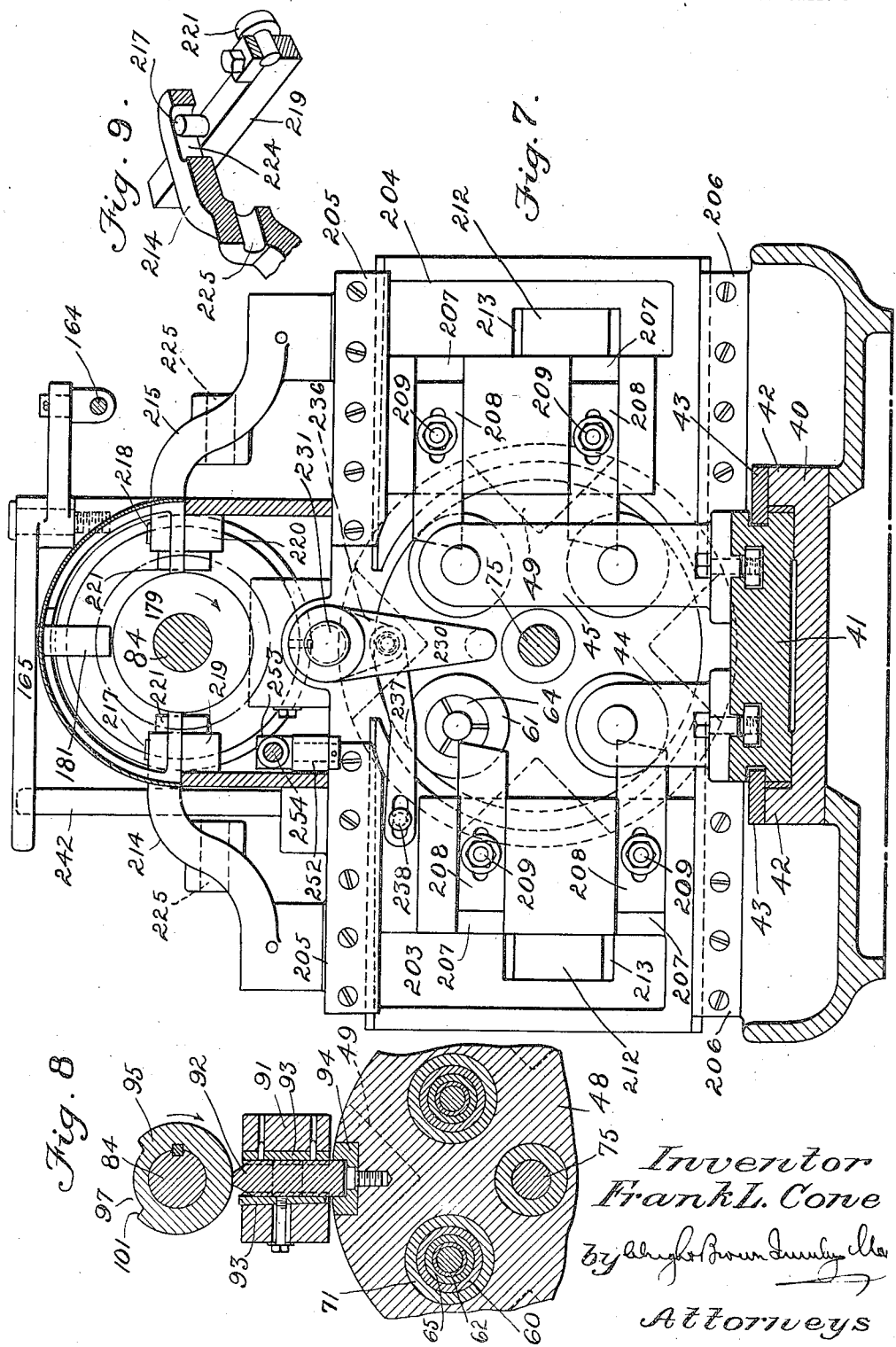

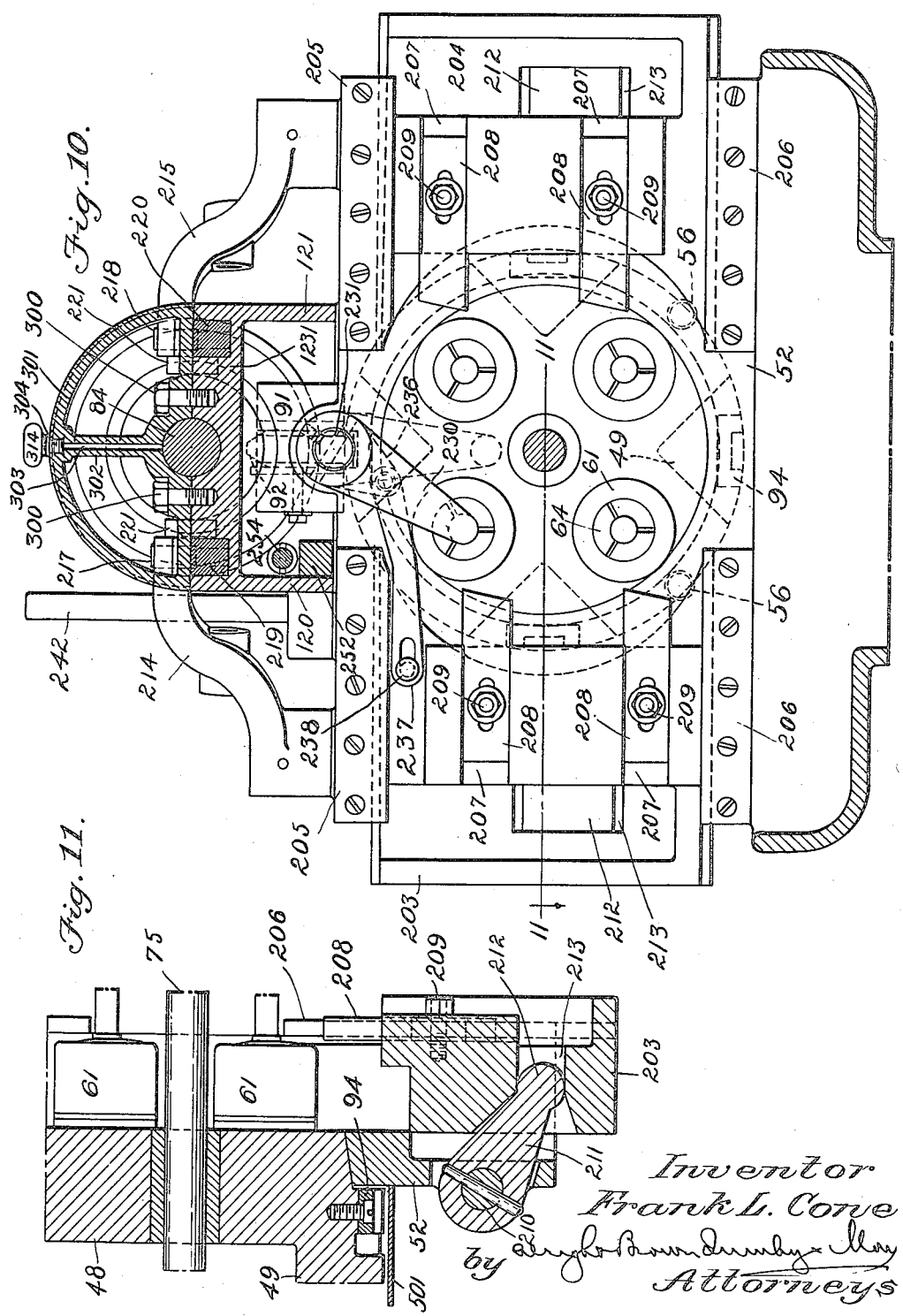

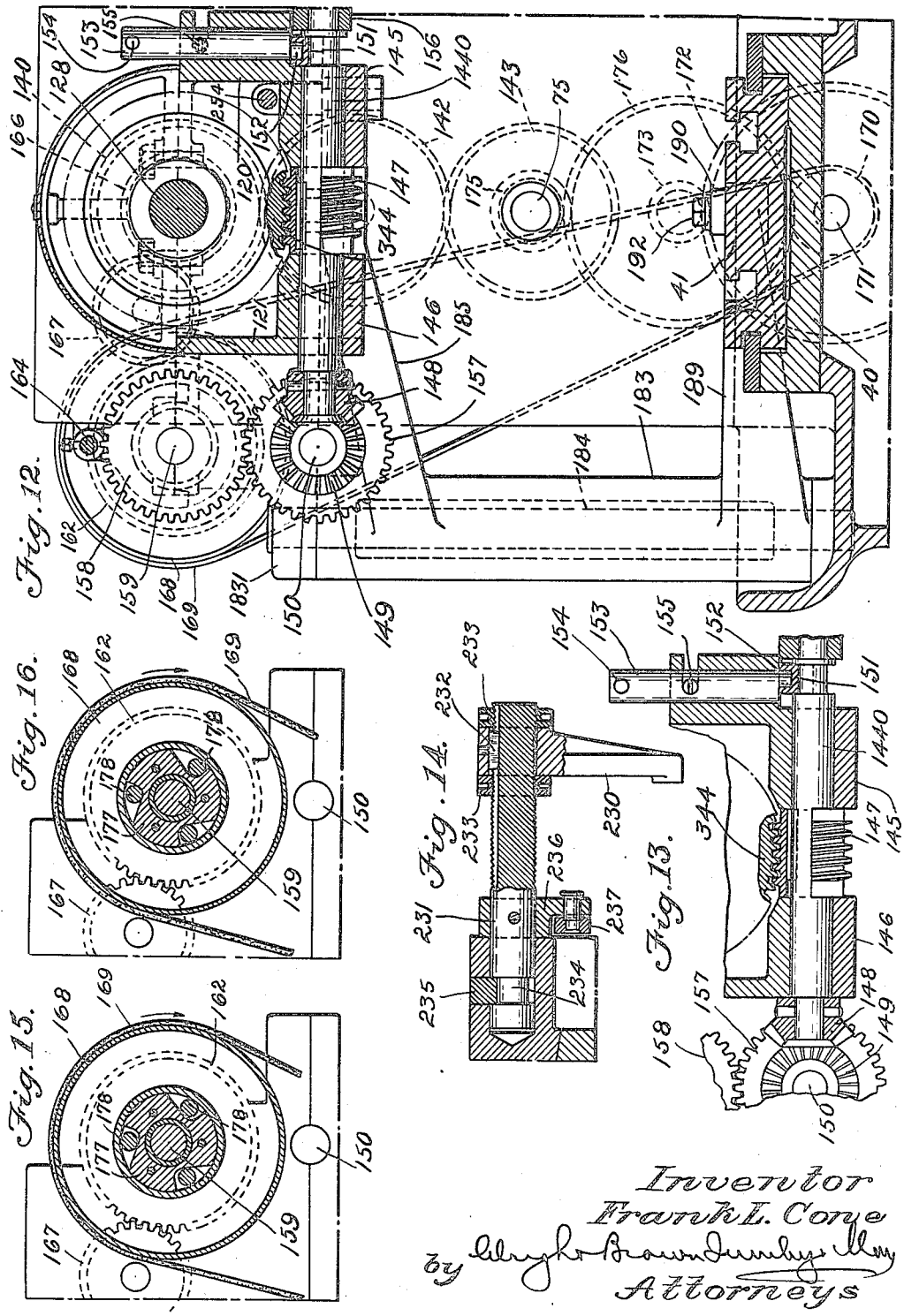

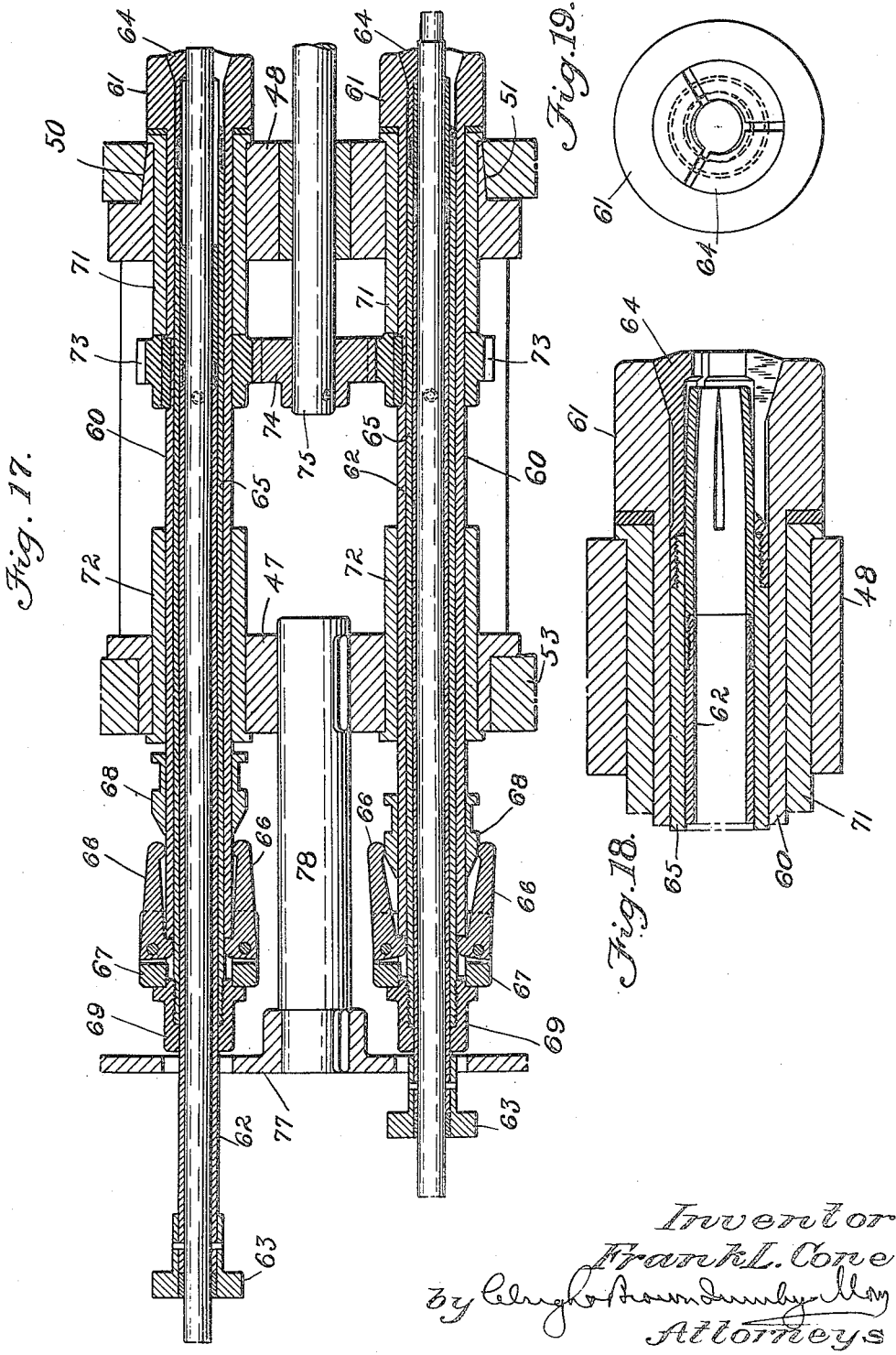

F. L. CONE.
AUTOMATIC SCREW MACHINE.
APPLICATION FILED AUG. 15, 1917.
1,271,540.
Patented July 9, 1918.
12 SHEETS—SHEET 12.
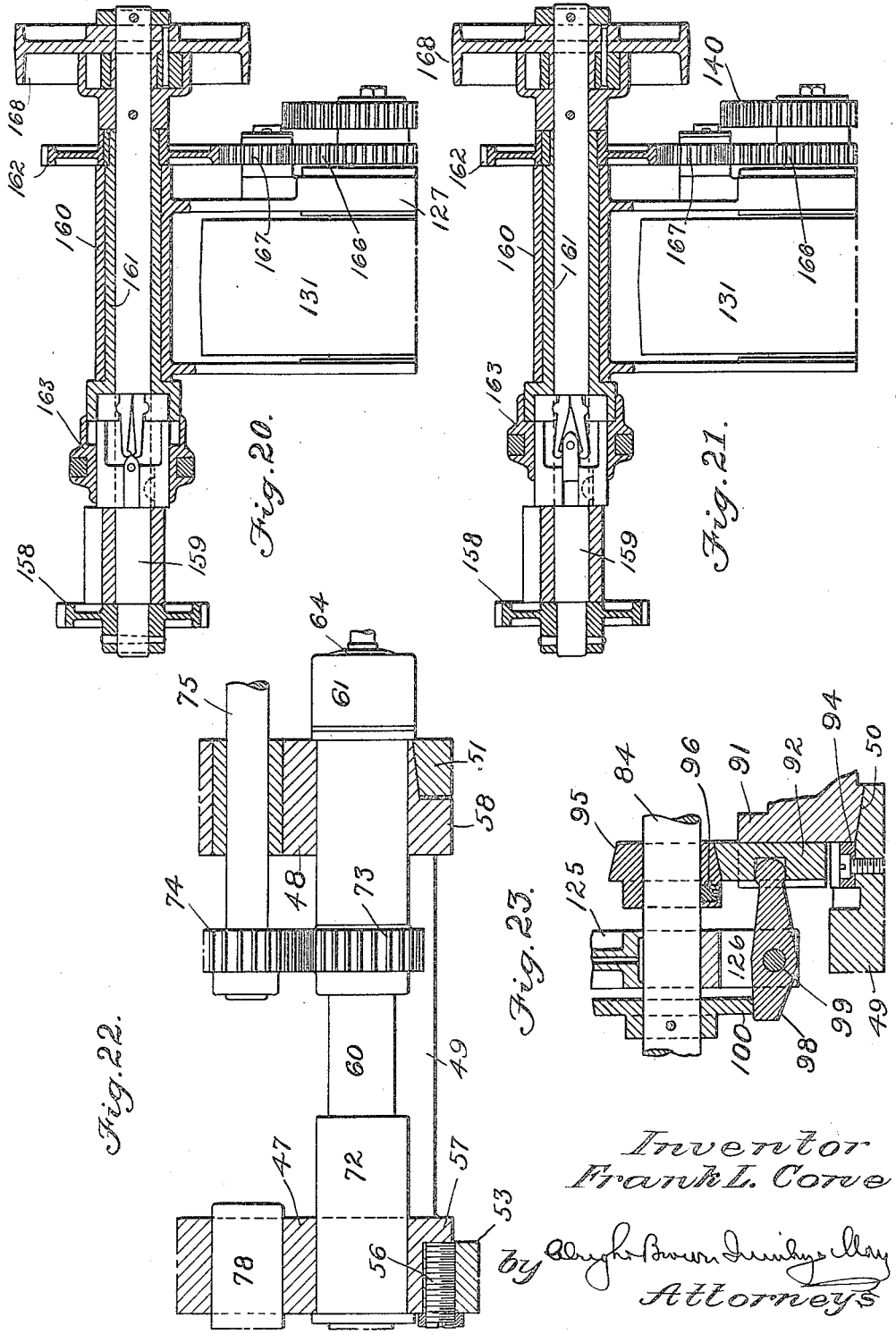

UNITED STATES PATENT OFFICE.

FRANK L. CONE, OF WINDSOR, VERMONT.

AUTOMATIC SCREW-MACHINE.

1,271,540.  Specification of Letters Patent.   Patented July 9, 1918.

Application filed August 15, 1917. Serial No. 186,311.

*To all whom it may concern:*

Be it known that I, FRANK L. CONE, a citizen of the United States, residing at Windsor, in the county of Windsor and State of Vermont, have invented new and useful Improvements in Automatic Screw-Machines, of which the following is a specification.

This invention has relation to metal-working machines and more particularly to automatic screw machines of the multiple-spindle type, in which a plurality of bars held by rotary spindles in a rotary turret are operated upon simultaneously by different cutters, and each bar is presented successively to all of the cutters. Ordinarily, in machines of this class, the power connections and instrumentalities, including the cam or feed shaft which effect the coördinated operation of the parts, are located within a frame below the horizontal plane of the turret axis, and they are therefore difficult of access, although, as is well known, it is frequently desirable to adjust and remove and replace some of the parts, as for instance the cams which impart movement to certain of the instrumentalities of the machine.

One of the objects of the present invention is to provide a machine of the character described, in which the power-transmitting instrumentalities, including the cams, the cam carriers and the parts operated thereby, shall be located in the upper portion of the machine where they are removed from chips and cuttings and where they are most convenient of access. Another object of the invention is to provide a machine in which I am able to attain accurate control, and great stability, as a result of which it is possible to produce exact duplicates of the desired work which are accurately formed as to all dimensions.

In accomplishing these objects, it is also a further object of the invention to provide an improved indexing and locking mechanism by which the turret, supporting the work, is locked rigidly to the main frame at a point close to the front ends of the spindles where the work being operated upon is supported.

The invention further has for its object to provide a number of improvements in machines of this general type, all of which will be explained in detail in the following specification and pointed out in the annexed claims. In this connection, it may be said also that in embodying the invention it is possible, by reason of my improvements, to secure great rigidity with a minimum weight of metal.

Referring to the accompanying drawings which illustrate an embodiment of the invention,—

Figure 1 represents a plan view of the machine.

Figure 3:
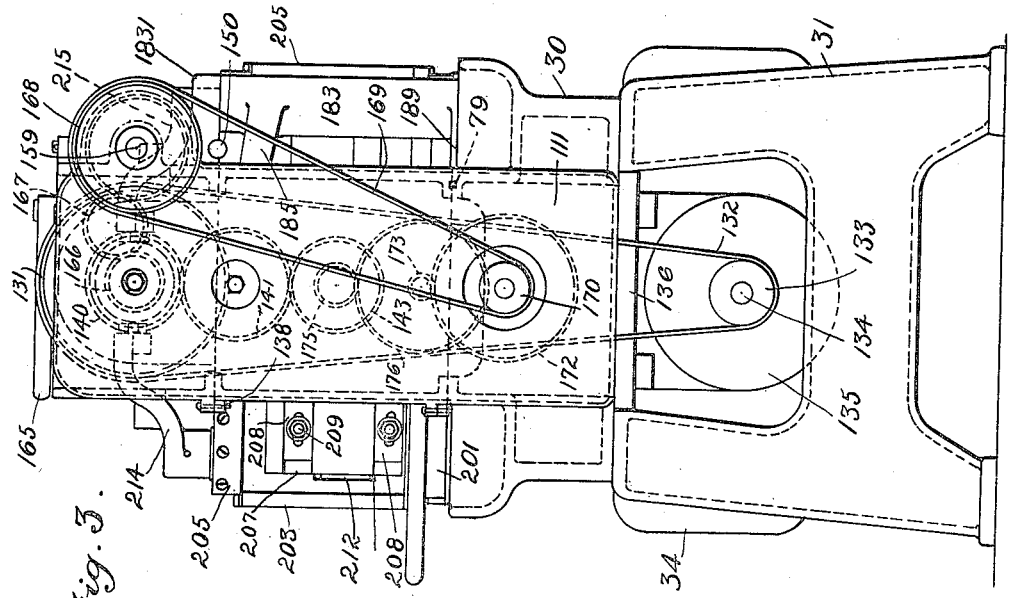
Fig. 3 represents an elevation of the other end of the machine.

Figs. 4 and 4ª taken together illustrate a front side elevation of the machine so far as the working parts thereof are concerned, the bed being broken away as indicated by the dot and dash lines.

Figs. 5 and 5ª taken together represent a longitudinal vertical section through the machine along the median line thereof.

Fig. 6 represents a longitudinal vertical section through the left end of the machine and illustrates the receptacle for the chips and cuttings.

Fig. 7 represents an end elevation partially in section looking from right to left and illustrating the spindle turret and the adjacent parts.

Fig. 8 represents a section through a portion of the turret or spindle carrier and illustrates in detail a portion of the turret-locking mechanism.

Fig. 9 represents in detail a portion of the cross-slide-operating connections by which hand operation of the cross slide is made possible.

Fig. 10 is a view similar to Fig. 7 except that certain parts are in cross section, the stock stop is in active position, and the cross slides are withdrawn.

Fig. 11 illustrates a horizontal section on the line 11—11 of Fig. 10 and illustrates the cross slide and a portion of its operating mechanism.

Fig. 12 represents a section on the line 12—12 of Fig. 1 and illustrates a part of the mechanism for rotating the cam carrier and the mechanism by which the cam carrier may be disconnected from the feed transmission to permit the rotation of the cam carrier by hand.

Fig. 13 illustrates a portion of the same mechanism but with the parts in a different position with the worm shaft disengaged from its driving mechanism.

Fig. 14 illustrates in section a portion of the stock stop.

Figs. 15 and 16 illustrate a roll clutch and adjacent parts which are employed in transmitting power from the spindle-driving shaft to the cam carrier.

Fig. 17 represents a horizontal longitudinal section through the turret and the spindles supported thereby.

Figs. 18 and 19 illustrate the construction of the chuck end of one of the spindles.

Figs. 20 and 21 show further details in the mechanism for imparting power to the cam carrier and illustrate the two clutches which are employed in connection with what may be termed the cam-carrier-drive shaft.

Fig. 22 is a partial section through the spindle carrier or turret and its bearing, and shows the mechanism for effecting an adjustment of the turret.

Fig. 23 illustrates in section a portion of the turret-locking mechanism.

Considered as a whole, the machine comprises a structure upon which the operative portions of the structure are all mounted and supported. Said structure comprises a lower bed and an upper bed arranged directly thereabove, said beds being spaced apart and rigidly secured together. The turret is located between the two beds, the bearings for the turret constituting framework which is interposed between said beds for spacing and rigidly connecting them at one end portion thereof. At the other end portion an interposed frame or standard is utilized for spacing and rigidly connecting the beds, and said frame is preferably made hollow so as to inclose a belt which transmits power from an underhung motor on the lower bed to a main drive shaft on the upper bed. The lower bed is supported at the ends by leg frames or standards, of which one is formed or provided with a chip receptacle located to receive chips or cuttings dropping from the work. This receptacle is open at one end and is accessible from the end of the machine so that the chips and cuttings may be easily raked therefrom into a box or truck.

The turret bearing is formed in two portions, or castings, bolted or otherwise secured at their upper and lower ends to the two beds. The forward bearing or main casting, in which the front end of the turret is journaled, also affords guideways for the cross slide and serves as a support for the locking mechanism for the turret, which locking mechanism is located close to what may be called the front or chuck ends of the spindles. The rear bearing for the turret is rigidly affixed to the two beds, and is removable so as to permit the removal of the turret. The front end of the turret is tapered so as to fit in a complemental bearing, and the turret may be adjusted so as always accurately to fit in its bearing by suitable means accessible from the rear end thereof. At the extreme end of the machine and in the rear of the turret there is a third frame for spacing and rigidly securing together the two beds, and in this frame is journaled an indexing disk, which forms, as it were, an extension of the turret and which is connected thereto by a centrally arranged shaft. The cutters are located upon three slides, of which one is the main slide arranged to travel back and forth in ways upon the lower bed, and the other two are cross slides, which, as previously indicated, move in guideways afforded by the main turret-supporting casting. These three slides are all operated simultaneously or in the desired sequence, according to the character of the finished work or the operations to produce the finished work, and they are all controlled by a cam shaft or cam carrier which is supported by the upper bed in a horizontal plane above the turret. This I regard as a highly desirable feature of the machine, since, by locating the cam shaft at the top of the machine, all of the operative parts, including the cams, are fully protected against chips and cuttings and are made easily accessible. I preferably incase the cam shaft and the parts supported thereby in a casing which at various portions of its length may be opened to permit access to the instrumentalities therein contained. Upon the cam shaft are mounted the cams for operating the main tool slide, the cross slides, the turret-indexing and locking mechanism, the chuck-opening and closing mechanism, the stock-feeding mechanism, and the mechanism for controlling the operation of the power-transmitting mechanism. The trains of gearing, which include the change-speed gears and which are utilized for transmitting power from the main drive shaft to the spindle carrier and the cam shaft, are all located at the end of the machine where they are easily accessible and where they are removed from the danger of access thereto of chips and cuttings. The turret-indexing mechanism, which as stated is located at the opposite end of the machine, is accessible for removal and repair. By reason of the construction which is thus briefly outlined, the machine may be quickly dismantled or assembled, the parts may be accurately alined and located, repairs may be quickly and easily effected, and great stability of control is secured.

Adverting once more to the cross slides, I have provided what I believe to be a novel construction by which it is possible to operate on all four spindles by cutters located upon the cross slides, thus making it possible to employ a cutting-off tool at any one of the four stations of each spindle without the use of special attachments. This is rendered possible by employing substantially flat cross slides which are arranged vertically and are mounted in vertical guideways so that the upper and lower portions of each slide are under accurate control. In this way, various tools (such as forming tools, cutting-off tools, etc.,) may be mounted upon each of the cross slides, one above the other, all as will be explained more at length in a subsequent portion of this specification.

Figure 2:
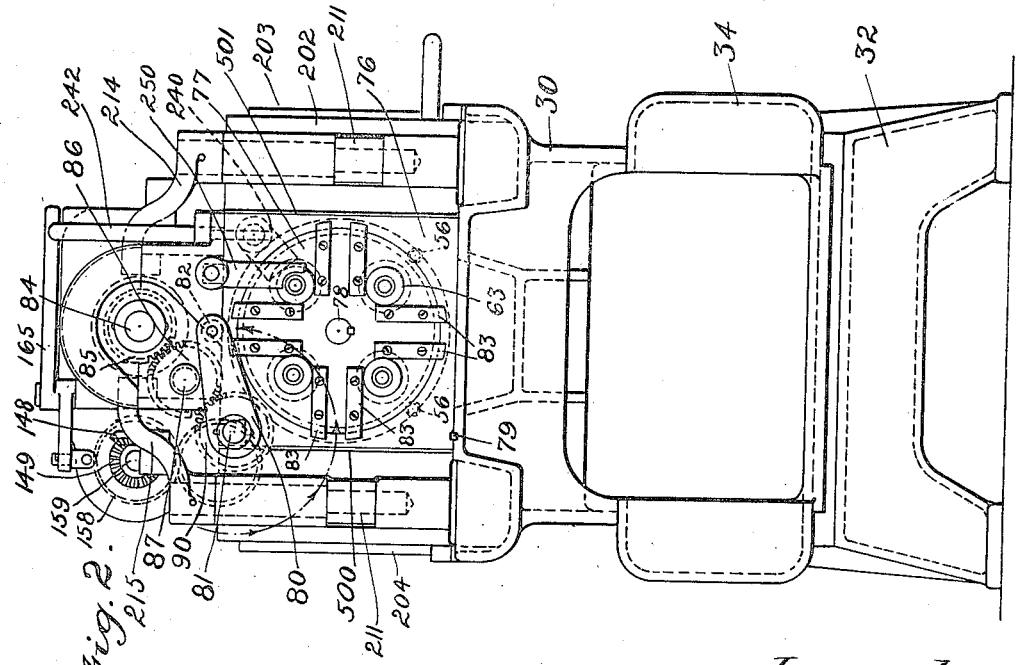
Fig. 2 represents an elevation of one end of the machine.

Referring now more particularly to Figs. 1, 2, 3 and 6, the lower bed is indicated at 30 and it consists of a casting of suitable length and width properly braced with cross bars or braces and longitudinal webs cast therewith. This bed is supported upon leg frames 31, 32, at the ends thereof and to which it is rigidly bolted. The leg frame 32 is provided with a chip receptacle or pan 34, as illustrated in Figs. 2 and 6, which is located immediately below the under side of the bed 30 and extends far enough to the right, as shown in Fig. 6, so as to be below the projecting portions of the work upon which the tools or cutters are operating. It will be noted in Fig. 6 that the lower bed is provided with a horizontal portion or table 35 upon which the turret bearings are supported as will be explained, and that the table terminates short of the projecting ends of the work so as to provide an opening 36 through which the chips may fall into the chip receptacle or pan 34. The left-hand end of the chip receptacle is open, and is high enough above the floor level so that a truck or removable receptacle 37 may be placed under its mouth to receive cuttings raked or scraped therefrom. The lower bed, as stated, is provided with cross braces, of which two are indicated at 38 and 39 and which form a support for a guideway 40 for the main tool slide 41, said guideway being at a lower level than the table 35 as best shown in Fig. 6.

*The main tool slide.*—The main tool slide 41, to which reference has thus been briefly made, consists of a substantially flat plate which moves in the guideway 40, as illustrated in Figs. 5ª and 7. The guideway 40 is provided at its front and rear marginal side portions with upstanding flanges 42 to receive the slide, and upon these flanges are placed gibs 43 which take into grooves in the front and rear side walls of the slide. Since the guideway 40 is lower than the table 35, the slide 41 is located in a plane below the two lowest spindles of the turret so that its front end may be advanced directly under the projecting portions of the work as shown in Fig. 6, and consequently tools on the end of the slide may operate on the work without any overhand. The slide is provided with undercut grooves or is otherwise fashioned to receive cutters on the upper face thereof. The cutters, as stated, may be located on the extremity of the tool slide so as to be moved along the work up to the chuck ends of the spindles. Cutters of box type may be employed, although for purposes of illustration I have illustrated upon the tool slide two upright adjustable standards 44, 45, which are illustrated as being provided with boring and drilling cutters. Of course on the slide there may be provided any number of turning tools for operating simultaneously upon the work at its different stations.

*The turret.*—The turret is of the barrel type; that is, it is arranged to rotate about a horizontal axis in substantially the median line of the machine, and it is mounted in bearings which are supported on the table 35 of the bed. The turret as a whole is indicated at 46. It consists of two disks 47, 48, which are connected by four equally-spaced sector-shaped bars 49 parallel to and equidistant from the axis of the disk, and all cast together as best indicated in Figs. 5, 6, 7 and 10. The turret is thus hollow and its sides are open except as they are closed by the relatively narrow bars or longitudinal portions 49. The reduced front end of the turret is tapering as indicated at 50, and it is journaled in a complementally tapered bearing 51 which forms a portion of what I have called a main casting or frame 52 which is approximately rectangular in front elevation, as shown in Fig. 10, and which is rigidly bolted and secured upon the table 35 of the lower bed 30. The reduced rear end of the turret is cylindrical and is journaled in a bearing frame 53, the exterior of which is approximately rectangular as shown in Fig. 2. This bearing frame is rigidly secured upon the table 35 of the bed and is removable therefrom to permit the removal of the turret. At its upper end the bearing 53 is split as at 54 in Fig. 5, and the split portions are drawn together by a clamping screw 55, there being between the split portions shims or spacers as ordinarily. By reference to Figs. 2 and 22, it will be observed that the bearing frame 53 is provided with a plurality of adjusting screws 56 (see Fig. 22) which are passed transversely therethrough and bear against the shoulder 57 formed on the rear end 47 of the turret. By rotating these adjusting screws which are arranged at different points, the whole turret may be adjusted longitudinally so as to force the front tapering portion 50 thereof into the tapered bearing 51 so as to compensate for wear and prevent lateral movement. It will be noted in this connection that the shoulder 57 is formed by a peripheral flange or rib on the turret and that at the other end there is a similar rib or flange 58. These flanges or ribs extend radially beyond the bearing surfaces of the turret. By having what may be termed the body, or the intermediate or the middle portion of the turret extend radially beyond the journals or bearing portions thereof, it enables me to employ thicker longitudinal bars 49 and at the same time to provide a relatively large empty space within the turret. The mechanisms for indexing the turret and for locking it will be subsequently described.

*The work spindles.*—Journaled in the turret are four work spindles which are indicated at 60 and which are provided at their ends with chucks 61, as shown in Fig. 17. It is unnecessary to describe the spindles in great detail since they may be of standard form. It is sufficient to say that each spindle is provided with a stock-feeding tube 62 to which is secured the spool 63. A collet 64 is secured on a sleeve or tube 65 which is clamped and unclamped by the fingers 66 pivoted to a head 67 and operated by a sliding tapered collar 68. The collet sleeve 65 has secured upon its end a nut 69 against which the head 67 bears and which provides for an adjustment of the collet. The stock-feeding tube and the collet-operating sleeve 68 are shown in different positions in Fig. 17. The spindles 60 are journaled in sleeves 71, 72, in the ends of the turret, said sleeves projecting toward each other so as to afford relatively long bearings for the spindles. Between the end portions of the turret each spindle is provided with a gear or pinion 73 and these pinions all mesh with a centrally arranged pinion or gear 74 mounted upon a shaft 75 which I term the spindle-driving shaft. From the shaft 75 power is imparted to all of the spindles to effect their synchronous rotation.

*Turret-indexing and locking mechanisms.*—At the extreme left end of the machine there is a third bearing frame 76, which is rigidly secured upon the table 35 and in which there is journaled a disk 77. This disk is connected to the turret by a centrally arranged shaft 78, which is keyed or splined both to the disk 77 and to the rear end 47 of the turret. If desired, the shaft 78 and the disk 77 may be formed integrally with the turret. It is by means of said disk 77 that the turret is indexed. The bearing frame 76 is substantially rectangular in face view, as shown in Fig. 2, and it and the bearing frames 53 and 52 are all accurately located upon the table 35 of the bed by a spline 79, as shown in Fig. 2. This facilitates the manufacture and assembling of the machine as the keyway of the spline extends to the opposite end of the bed, except where it is interrupted by openings or spaces, so as to provide for an accurate alinement of the stationary parts supported upon the lower bed.

The mechanism which I employ in connection with the disk 77 for indexing the turret is the well known Geneva stop mechanism. It consists of an arm 80 mounted upon a shaft 81, as shown in Fig. 2, and having upon its end a roll 82, which, during its revolution, enters radial guideways afforded by pairs of guide bars 83, 83, on the outer face of the disk 77. These guide bars have their extremities projecting beyond the internal bearing surface of the bearing 76, so that I am able to secure an increased leverage upon the turret. As the arm 80 rotates in the direction of the arrow in Fig. 2, the roll enters the left-hand guideway which is then horizontal, and, during the rotation of the shaft the turret is rotated through an arc of 90°. By having the guide bars 83 extend beyond the bearing, it is possible accurately to hold the turret momentarily at the end of its rotative step and give time for the locking pin to lock the turret in position. The shaft 81 may be rotated by any convenient mechanism. I employ a simple train of gears for accomplishing the rotation of said shaft from the main cam shaft. This cam shaft, which will be described more in detail subsequently, is indicated at 84, and upon its extreme left-hand end it is provided with a gear 85, which, through an idler gear 86 on a stud shaft 87, drives a gear 90 on the shaft 81. This mechanism is illustrated in Figs. 1, 2 and 5.

The locking mechanism for the turret is operated from the same cam shaft 84, as shown in Figs. 5 and 8. The main turret casting frame 52 is formed at its upper portion above the turret bearing with an upstanding portion 91, having a rectangular guideway to receive a locking pin 92 which is accurately guided by hardened steel gibs 93, of which one is doweled and the other clamped in place by a clamping screw. The locking pin itself is rectangular in cross section and is formed of hardened steel, and its lower end is arranged to enter any one of four hardened steel locking blocks 94 secured in sockets in the end portion 48 of the turret between the two bearings 51 and 53. The locking pin, when the turret is in a state of rest, is held positively in engagement with the locking block by means of a rotative lock consisting in the present case of a tapered disk 95 splined upon the cam shaft 84 and held against longitudinal movement by a set screw 96. The periphery of the disk is provided with a recess 97 of such radial depth that, when the recess registers with the tapered end of the locking pin, the latter may be raised a sufficient distance to disengage it from the locking block. The pin is raised positively by a lever 98 (see Fig. 5) which is pivoted midway between its ends upon a pivot 99 and which is rocked by a cam 100 pinned upon the cam shaft 84. During each rotation of the cam shaft, the locking pin 92 is released and positively disengaged from a pin block on the turret, and, after the turret has been advanced one step, the pin either drops by gravity into the next pin block or else is thrust positively thereinto, the shoulder 101 at the end of the recess 97 engaging the tapered upper end of the pin and forcing it downwardly. Thereafter during the single rotation of the cam shaft, the locking pin is locked positively in the pin block. From this description, it will be seen that the turret is indexed from its rear or left-hand end and is locked at its right-hand end in a vertical transverse plane close to the chucks of the spindles. The locking pin itself is mounted to slide in the casting which forms the front bearing for the turret but is rigidly held against lateral movement, and consequently the turret is held rigidly against all loose movement after it has once been indexed and locked. The shaft (in the present case the cam shaft), which operates the turret-indexing and the turret-locking mechanisms, is located above the turret and its axis is in a vertical longitudinal plane coincident with the axis of the turret. The train of gears which effect the rotation of the indexing arm are all exposed at the end of the machine where they are easy of access, and the locking mechanism itself is accessible through a casing which incloses the cam shaft and which has removable doors for the purpose as will be subsequently explained.

*The upper bed.*—The upper bed of the machine supports the cam shaft 84, to which reference has been made, and contains within it the cam drums on said shaft. It is narrower from front to rear than the lower bed, as shown in Fig. 1, and it comprises front and rear side walls 120, 121, which are connected by a transverse wall 124 at the left-hand end, a transverse wall 122 near the other end, and intermediate cross walls 123, 1231 and 125, as shown in Figs. 5 and 5ª. Said upper bed is rigidly bolted and secured upon the three bearing frames 76, 53 and 52, on the turret end of the machine, its front and rear side walls having base flanges 1211, 1211, which rest upon the flat tops of said frame and through which the securing bolts 1212, 1212, are passed into said frames (see Fig. 1). At the right-hand end of the machine the upper bed is supported by a hollow frame or column 110, which rests upon and is secured to the lower bed, and thus the entire upper bed is rigidly connected to and vertically spaced from the lower bed. The hollow column is approximately rectangular in cross section and it rests upon a box 111 suitably formed by longitudinal and transverse walls of the lower bed, of which one is the left end wall of said lower bed, to provide a relatively large vertical passageway for the purpose to be subsequently described. The front and rear side walls 120, 121, of the upper bed are connected at their right-hand extremities by a removable end wall 127, which, with the cross wall 122, rest upon and register with the corresponding end walls of the hollow frame or column 110. The cross wall 125 of the upper bed has depending ears 126 affording a support for the pivot 99 of the locking-pin-lever 98 previously described. The end wall 124 of the upper bed supports the stud shaft 87 for the gear 86 of the gear train which actuates the indexing arm 80 of the turret-indexing mechanism. The cam shaft 84 is journaled in the cross walls 123, 1231 and 125, and in the end wall 124, as shown in Figs. 5 and 5ª. At the right-hand end of the upper bed, the removable end wall 127 and the cross wall 122 form a support to receive the main drive shaft 128 which is preferably mounted in Hyatt roller bearings 129, 130. This main drive shaft is equipped with a belt pulley 131, from which a belt 132 extends through the lower standard 110, and the box 111 on the end of the lower bed, to a pulley 133 on the end of a motor shaft 134. The motor as a whole is indicated at 135 and it is hung from a plate 136 secured to the under side of the bed 30. I have not attempted to illustrate the motor-controlling mechanism, but of course it will be understood that the motor will be provided with the proper rheostat or starting resistance. The belt 132, it will thus be seen, is inclosed within a box-like structure which is open at it upper and lower ends, such structure including the box 111 at the end of the lower bed, the hollow standard 110, and the end portion of the upper bed including the cross and end walls 122 and 127 as best shown in Fig. 1 and 5ª. In order to afford access, however, to the interior of the box, the end wall of the standard 110, which is indicated at 139, is hung on hinges 138 secured to the front wall of the box so that it may be opened.

*The spindle-driving mechanism.*—The spindles are driven by the spindle-driving shaft 75 as already explained, and this shaft is driven at constant speed from the main drive shaft 128. The shaft 75 extends longitudinally of the machine approximately midway between the upper and the lower beds, and at its right-hand end is journaled in a bushing 751 placed in a tubular support 752 connecting the end walls of the hollow column 110. Said shaft is actuated from the main drive shaft 128 by power-transmitting mechanism consisting of a train of four gears which are indicated at 140, 141, 142 and 143. The gear 140 is keyed upon the main drive shaft 128 outside the end wall 127, and it intermeshes with the gear 141 which is journaled upon a stud shaft 144 supported by the column 110. Secured to the gear 141 is a gear 142 which intermeshes with and drives the gear 143 which is secured upon the spindle-driving shaft 75. All four gears constitute change gears, and, since they are located outside the end walls of the two beds and the supporting column 110, they may be removed and replaced by others having a different ratio so as to rotate the spindle-driving shaft from the main shaft at any predetermined rate of speed that may be desired.

*The cam shaft and its actuating mechanisms.*—The cam shaft and the various cams which are located thereon, and which have been and subsequently will be described, are located in the upper bed midway between the front and rear walls thereof. The cam shaft is supported in bearings afforded by the cross bars 124, 125, 1231 and 123, as hereinafter stated. In conjunction with each cross bar, there is a complemental cap, of which only one need be described as they are all substantially the same in construction. I will describe the cap which is employed in conjunction with the cross bar 1231 and which is illustrated in Fig. 10. It is bolted upon the cross bar by the bolts 300 and forms a half of the bearing for the shaft. It is provided with a semi-cylindrical rim 301, which forms an arch between the rear and front walls of the bed, and with a vertical spoke-like rib 302 having a conduit 303 through which oil may be introduced into the bearing. This conduit or duct is closed by a screw oil cup 304. Between each pair of adjacent bearings, the upper bed is provided with a removable semi-cylindrical cover, which covers in Fig. 1 are indicated at 310, 311, 312 and 313. Each cover is provided with a handle 314 by which it may be removed. These covers, together with the front and rear wall and the end walls of the upper bed, form a closed casing in which is incased all of the parts which are located upon the cam shaft.

The cam shaft 84 is driven at either of two different speeds. When the tools are working, it is driven at a slow speed, and, during the idle movements of the tools as when the main tool slide is being withdrawn and advanced to potential working position and the turret is being indexed and locked, the cam shaft is driven at high speed. When being driven at slow speed, the power is transmitted thereto from the spindle-driving shaft 75, but otherwise the cam shaft is rotated by gearing actuated by the main drive shaft through the medium of a cross worm-shaft 1440 which is arranged transversely thereof and beneath it as shown in Fig. 12. This shaft is supported in bearings 145, 146, formed on the front and rear walls 120, 121, of the upper bed, the bearings being spaced far enough apart to receive between them a worm 147 which is splined upon the shaft 1440, and which meshes with a worm wheel 344 pinned on the cam shaft. At its rear end the worm shaft is provided with a bevel gear 148 which may intermesh with, so as to be driven by, a bevel gear 149 on a shaft 150 which is parallel to the cam shaft but in a plane therebelow. The shaft 1440 may be moved lengthwise for the purpose of causing the engagement or disengagement of the bevel gears 148, 149, in order that, when the worm shaft is idle, the worm shaft may be driven by hand as when setting up the tools. To accomplish this movement of the shaft 1440, its front end is provided with a peripheral groove to receive a block 151 engaged by a crank pin 152 formed upon an upright shaft 153 which is accessible from the front of the machine. This shaft 153 is provided with a handle 154 which may be swung through an arc of 180°. As shown in Fig. 12, the shaft 1440 has been thrust to the rear to cause the engagement of the bevel gear 148 with the bevel gear 149 and in this case the handle 154 will occupy the position shown in Fig. 4ᵃ, in which case the pin 152 is at a dead center and holds the shaft 1440 against outward axial movement. In Fig. 13, the parts are in the position in which they will appear when the handle 154 has been moved through an arc of 180° so as to shift the worm shaft to its forward position and thus effect the disengagement of the bevel gear 148 from its complemental gear 149. To limit the rotative movement of the shaft 153, it is provided with a pin 155 which plays in a recess formed in the bearing for said shaft. A hand wheel 156 is located upon the forward extremity of the worm shaft to permit its being rotated by hand.

The shaft 150 is a relatively short shaft and is provided at its end opposite the bevel gear 149 with a gear 157 (see Fig. 5ᵃ) which intermeshes with and is driven by a gear 158 on the shaft 159, the axis of which is in the same horizontal plane as the axis of the cam shaft. The shaft 159 is shown in detail in Figs. 20 and 21, and it is adapted to be driven at either of two different speeds from the main drive mechanism or from the spindle shaft. This shaft is journaled in a bearing 160 which is formed on the rear side of the upper bed frame as shown in Fig. 1. It is provided with a sleeve 161 loosely mounted thereon and which is provided with a gear 162 keyed to said sleeve. This gear 162 is driven from the spindle-driving mechanism as will be explained. The sleeve may be clutched to the shaft 159 by any suitable clutch mechanism controlled by a collar 163. This collar, as shown in Fig. 1, has connected thereto by means of a link 164 a handle lever 165 by which it may be shifted back and forth so as to clutch or unclutch the sleeve 61 to the shaft 159. As illustrated, the clutch is of the expansible ring variety, but it will be understood that any other form of clutch may be substituted therefor. The gear 162 is driven from the main drive shaft 128 by a gear 166 on said drive shaft and an intermediate idler gear 167 interposed between them. When the clutch collar 163 has been moved to operative position, the shaft 159 is driven at high speed upon the main drive shaft 128. At other times the said shaft 159 is driven from the spindle-driving shaft. To accomplish this result, there is mounted loosely upon said shaft 159 a pulley 168 connected by a belt 169 to a small pulley 170, shown in Fig. 5ª, which is mounted upon a stud shaft 171 extending from the end of the lower bed in a plane below the horizontal plane of the spindle-driving shaft 75. Secured to the pulley 170 there is a gear 172 intermeshing with and driven by a pinion 173 on a stud shaft 174 supported by the frame or column 110. A small pinion 175 on the spindle-driving shaft 75 intermeshes with gear 176 which is secured to pinion 173 by being keyed upon the hub thereof. By the train of gearing just described, the pulley 170 is driven constantly directly from the spindle-driving shaft 75, and through the belt 169 drives the pulley 168 on the shaft 159. Between the pulley 168 and the shaft 159 there is a take-up roller-ratchet clutch indicated as a whole at 177, as shown in Figs. 15 and 16. When the shaft 159 is being driven at high speed from the main drive shaft, the pulley 168 will be permitted to run free, since it is moving at a slower speed than the shaft 159, the clutch rollers 178 assuming the inactive positions shown in Fig. 16. When the clutch collar has been moved to inactive position so as to disconnect the gear 162 from the shaft 159, upon the cessation in speed of rotation of the shaft 159, it will be picked up through the ratchet clutch by the pulley 168 and thereafter will be driven at slow speed from the spindle-driving mechanism.

I may advert at this point to the fact that the trains of gear interposed between the main drive shaft and the spindle-driving shaft, and interposed between the spindle-driving shaft and the pulley 170 (all as shown in Fig. 5ª), are located at the right-hand end of the machine and are on the exterior wall of the box-like structure at that end of the machine. These gears are all mounted upon the ends of shafts which project through the end wall of such structure or else they are mounted upon stud shafts which are supported thereby. Consequently they are accessible for easy removal. With the exception of the pulleys 168, 170 and the belt 169, these power-transmitting mechanisms are all inclosed within a removable cover or casing 139 at the end of the machine.

It is quite apparent from the foregoing description of the power-transmitting mechanisms that the worm shaft may be disconnected from the driving mechanism so as to permit the cam shaft to be rotated by hand; and also that the cam shaft may be driven either at slow speed during the active movement of the tools or at high speed during the idle movements of the tools. It is also apparent that there is but a single clutch collar which need be actuated to control the speed of rotation of the cam shaft, and that this may be operated by hand. In order that the speed of the cam shaft may be automatically controlled, however, a cam drum 179 is pinned upon the cam shaft, as shown in Fig. 5ª, and it is provided with cams which are indicated conventionally at 180. These cams operate upon a stud 181 depending from the lever 165 so as to rock the lever in one direction or the other at such times as may be desired.

*Feeding mechanism for main tool slide.*— The cam shaft is provided with cams which cause the operation of the main tool slide. This mechanism comprises a cam drum 182 secured upon the right-hand end of the cam shaft and which is provided with cams (not shown) for operating a vertically arranged rock shaft having two arms of which one is connected to the main tool slide, the other being provided with a roller located in the path of the cams on the cam drum. The rock shaft itself is indicated at 183. It is tubular and it is journaled upon a vertical stud shaft indicated in dotted lines in Fig. 5ª at 184. The ends of this shaft are journaled in the upper and lower beds, said upper bed having a large ear or lug 1831 projecting from the rear side wall thereof for the purpose. At its upper end, the rock shaft has an arm 185 provided with a stud 186 and a roll 188 which may be engaged by cams on the cam drum 182. At its lower end the rock shaft has a similar arm 189 which is connected by a hardened steel link 190 with the right-hand end of the main tool slide 41. The link is connected to these two parts by a pin 191 and a screw pin 192 both of hardened steel. The rock shaft is located in the rear of the longitudinal vertical plane of the machine and the arms extend forwardly, as shown in Fig. 4ª. As the cam drum rotates, the rock shaft will be oscillated to feed the main tool slide forwardly at slow speed and to withdraw it at high speed, it being understood, however, that the slow speed need not be initiated until the tools on the tool slide have been brought again into a position where they are about to engage the work.

*The cross slides.*—The cross slides, as previously stated, are both arranged vertically (that is in a vertical plane transverse to the longitudinal median line of the machine), and they are supported and guided by the main casting or frame which affords a bearing for the front end of the spindle carrier or turret. On examining Figs. 2, 4, 10 and 11, it will be observed that the said main casting 52 is provided with a guideway, said guideway comprising an upper wall 200, a lower wall 201 and a vertical wall 202. There are two of these guideways, one at the front and the other at the rear of the frame, that is, both in front and in rear of the turret. In the two guideways thus afforded, there are placed the two cross slides which are indicated at 203, 204. They are arranged in a vertical transverse plane and at their upper and lower portions are guided and held in place by the gibs 205, 206, rigidly secured to the end face of said main casting 52 one vertically above the other. The front cross slide is shown in horizontal section in Fig. 11. In the front face of each of the cross slides there are grooves 207 in which various cutters 208 may be located. Any suitable means may be utilized, however, for securing the cutters to the cross slides, as for example screws 209 passed through slots in the cutters. As shown, each cross slide is provided with cutters for operating upon the work held in the two spindles nearest thereto. One cutter, for example, may be for the purpose of cutting off the work, two others for rough-forming and finish-forming the work, and the fourth cutter may be utilized for grooving, facing, nurling or thread-rolling the work.

Because of the construction and arrangement of parts which I have thus described in connection with the cross slides, it will be apparent that they are supported and carried by the main casting to which the front end of the turret is journaled and to which it is locked, and that I may thereby secure great stability of the cutters and their supporting slides in reference to the work. I regard this as an important feature of the machine as illustrated, as it enables me to secure accurate diameter-control of the tools and the work. Any suitable means may be utilized for cross-feeding the slides, but I find that a simple mechanism, such as illustrated and now to be described, suffices for the purpose. I employ for each slide a vertical rock shaft 210, of which one is shown in Fig. 11. Each rock shaft has pinned thereon a short arm 211 having a semi-cylindrical end 212 which enters a socket 213 formed in the cross slide. These two vertical shafts 210 are provided at their upper ends with arms which are illustrated in Fig. 10 at 214, 215, that at 214 being for the front cross slide and that at 215 for the rear cross slide. The two arms project rearwardly and forwardly respectively, and their inner ends are slotted so as to engage pins 217, 218, on two slide bars 219, 220. These slide bars are supported in guideways afforded by the cross walls 124, 125, between the front and rear walls of the upper bed. They are provided with rolls 221 which are arranged in the path of cams on two cam drums 222, 223, on the cam shaft 84. One cam drum carries cams for operating the slide bar 219 and the other drum is provided with cams for operating the other slide bar 220. Fig. 9 is a detail view which illustrates the pins 217 extending through a slot 224 in the arm 214. It will be noted that the arm 214 illustrated in this last-mentioned figure has an aperture 225 to receive a handle by which the arm may be moved to rock the rock shaft upon which it is mounted and thus advance or retract the associated cross slide by hand. The other arm 215 is similarly provided with a like aperture as shown in Fig. 7. Of course it is not essential that the two drums 223, 222, should be formed separately, since a single drum would suffice for the purpose, but it is desirable that the cams which control the operations of the two cross slides should be independent, so that the feeding or withdrawal of the cross slides need not be synchronous or to the same extent. By providing the slide bars between the rocking arms 214 or 215 and the cams, and mounting the said bars in guides which hold them against lateral movement, I localize the strains on the cam shaft as endwise in direction, thereby eliminating cross strains on the cam shaft.

*The stock stop.*—A stock stop mechanism is provided which is automatic in operation, and which is located to operate upon the stock in the front upper spindle. Said stock stop mechanism is connected to and operated directly by one of the cross slides, preferably the front cross slide. It consists of an arm 230 which is best shown in Figs. 7, 10 and 14. The hub of this arm is placed loosely upon the threaded extremity of a shaft 231 but it is provided with a key 232 which lies in a keyway or groove in said shaft so that it is secured thereto to rotate therewith but may be adjusted longitudinally thereof. After adjustment, it is held in place by nuts 233. The opposite end of the shaft is inserted in a socket formed in the upper portion of the main frame casting 52 which forms a part of the turret support. Near its end the said shaft is provided with a peripheral groove 234 with which may be engaged an angular cross pin 235 to hold it in place. By withdrawing the cross pin, the shaft is removable endwise from its socket. There is pinned to the shaft another arm 236 which is connected by a link 237 with a pin 238 on the front cross slide. This pin extends through a slot in the link so as to permit a certain amount of lost motion between the link and the cross slide. When the cross slide is moving inwardly toward potential working position, the stock stop arm 230 hangs vertically downward from the shaft 231, but, when the cross slide is reaching the extreme of its movement away from the turret, the pin 238 engages the end wall of the slot in the link 237, and rocking the shaft 231 swings the end of the stock stop arm 230 to active position, as shown in Fig. 10.

*Stock feeding mechanism.*—There remains now to be described the automatic mechanism for effecting the feeding of the stock through the spindles. This mechanism is very simple, as will be apparent from an inspection of Figs. 2, 4 and 10, in which it is best illustrated. It will be recalled that each spindle is provided with a stock-feeding spool 63, which, in being moved endwise, causes the feeding of the stock through the spindle. These spools are all located on the rear ends of the spindles and are located endwise beyond the frame 76. I have also explained that the chuck collet is released by the operation of the collars 68. I will now explain how these parts are moved or operated.

For actuating the collars 68 successively, a bar 240 is located in the path of each collar when the associated spindle reaches its stock-feeding station, which in the present case is when the spindle is in a front and upper position as shown in Fig. 10. This bar is upon the end of a slide 241 which extends through the spindle bearing 53 and has a pin and slot connection at its other end with a lever 242 fulcrumed upon the pivot 243, projecting forwardly from the front wall 120 of the upper bed. This lever may be operated by hand and it also may be operated automatically, being to this end provided with a stud 244 carrying a roll 245 located adjacent a cam carrier or drum 246 on the main cam shaft 84, so as to be engaged by cams on said drum and rocked in one direction or the other. At the proper time, a cam engages the roller 245 and rocks the lever 242 upon its pivot 243 so as to move the slide 241 to the right in Fig. 4 to operate the chuck collet endwise and release the stock so that it may be fed. The actual stock feeding is accomplished by an arm 250 which hangs pendant and which is formed to engage the stock-feeding spools 63 successively as they come to the proper station. The said arm 250 is hung upon the slide bar 252 which extends through the turret bearings. The end of this bar or slide, which is rectangular in cross section, can be seen in Fig. 7, and it is also shown in dotted lines in Fig. 4ª. To the bar is secured a block 253 through which a rod 254 extends and which is connected by a pin 255 to the upper arm 185 of the rock shaft 183 which transmits power to the main tool slide 41. On the left extremity of the rod 254 there is a collar 256, and between the collar and the block 253 there is a compression spring 257. From this description it will be now apparent that the stock-feeding slide 252 is moved by the main tool-slide-operating mechanism to feed the stock, but that it is actuated yieldingly because of the interposed spring 257. The provision of this spring enables the stock to be brought up firmly against the stock stop, and it also prevents breakage of parts in cases where the rod begins its movement before the stock is released by the collet or is grasped by the collet before said rod has ceased its movement to the right. The provision of the spring also is of great assistance in feeding up the last portions of the work bars when but short lengths remain.

*Conclusion.*—A detailed description of the operation of the machine is unnecessary, since the sequence of the operations depends upon the character of the particular work being produced. The various cams on the several drums are fashioned as to length and lead as to cause the operation of the instrumentalities which they actuate or control in proper time. The turret is indexed and locked, and the several tool carriers are fed and withdrawn simultaneously or in sequence as demanded by the character of the tools thereon or of the pieces being produced. I may point out, however, that the thrusts against the cam shaft, due to the operation of the tool carriers and the other parts, are practically all endwise of the shaft, and that they are resisted by the cross wall 123 against which bears the hub of the worm wheel 344 pinned to the shaft. The cam shaft is held against axial movement in the opposite direction by the engagement with said cross wall of the hub of cam drum 182 which is also pinned to the shaft. By removing the caps of the cam-shaft bearings, the cam shaft and the cams and the parts carried thereby may be lifted bodily and removed laterally (*i. e.* of its length) from the bed.

There are several features of advantage possessed by a machine such as herein described additional to those which have already been mentioned, and they may be briefly alluded to as follows. The gears on the spindles, by which they are actuated by the common drive spindle, are located between the ends of the turret and relatively close to the chucks on the spindles, and yet access thereto easily may be had through the open sides of the turret. The locking blocks, with which the locking pin is engaged, are all radially more remote from the axis of the turret than the peripheral bearing surfaces thereof, and an increased leverage is secured to hold the turret against any rotative movement when the tools are operating on the work, in addition to insuring greater accuracy in locating the spindles at their desired stations. Again, increasing the diameter of the turret between the bearings permits the use of relatively large bars which connect the ends of the turret and gives greater space for the working parts (i. e. the gears) within the turret. The working parts are substantially all incased, which means, of course, greater safety to the operator. The spaces between the upper and lower beds in front and in the rear of the turret are closed by removable walls indicated at 500, 501, so that the turret including the chuck-operating mechanism is inclosed. Even the indexing gears 85, 86, 87, are located in recesses (see Figs. 2 and 5) where they are to all intents and purposes incased. There are numerous features of advantage incident to the machine herein described, which will be apparent to those skilled in the art, by which I have attained simplicity of construction and a small number of operating parts, such, for example, as the operation of the stock stop by a cross tool slide, and the operation of the stock-feeding mechanism by the main tool slide, or the arm by which said slide is operated, but of all of which no special mention need be made.

Having thus explained the nature of my said invention and described a way of making and using the same, although without attempting to set forth all of the forms in which it may be made or all of the modes of its use, what I claim is:

1. A screw machine comprising a lower bed, an upper bed thereabove, frames spacing and rigidly connecting said beds, a tool slide mounted to reciprocate on the lower bed, a feed shaft mounted on the upper bed, and operative connections between said feed shaft and said slide.

2. A screw machine comprising a lower bed, an upper bed thereabove, frames spacing and rigidly connecting said beds, a tool slide mounted to reciprocate on the lower bed, a feed shaft mounted on the upper bed, a cam drum on said feed shaft, an upright rock shaft having one arm actuated by cams on said cam drum and having another arm connected to said tool slide.

3. A screw machine comprising a lower bed, an upper bed thereabove, frames spacing and rigidly connecting said beds, a tool slide mounted to reciprocate on the lower bed, a feed shaft mounted on the upper bed, operative connections between the feed shaft and the tool slide, and a spindle carrier mounted in certain of said frames and located between said beds.

4. A screw machine comprising a bed, a tool slide mounted to reciprocate thereon, a feed shaft arranged above the tool slide, and operative connections between said shaft and said slide.

5. A screw machine comprising a bed, a tool slide mounted to reciprocate thereon, a feed shaft arranged above the tool slide and having a cam drum thereon, and operative mechanism actuated by cams on said drum for reciprocating said tool slide.

6. A screw machine comprising a bed, a tool slide mounted to reciprocate thereon, a feed shaft arranged above the tool slide and having a cam drum thereon, an upright rock shaft having arms, one of said arms being disposed to be actuated by cams on said cam drum, and means connecting another of said arms to said tool slide.

7. An automatic screw machine comprising a lower bed, a tool slide reciprocated thereon, an upper bed disposed directly above and spaced from said lower bed, a cam shaft journaled in said upper bed, a turret disposed between said beds, and operative mechanisms actuated by the cam shaft for reciprocating said slide and indexing said turret.

8. An automatic screw machine comprising a lower bed, a tool slide reciprocated thereon, an upper bed disposed directly above and spaced from said lower bed, turret-bearing frames interposed between said beds and securing them together, a turret journaled in said frames, a cam shaft journaled in the upper bed, and operative mechanisms actuated by said cam shaft for reciprocating said tool slide, indexing the turret and locking the turret.

9. An automatic screw machine comprising a lower bed, an upper bed, a turret located between said beds, a shaft journaled in said upper bed above the turret, and turret-indexing mechanism actuated by said shaft.

10. An automatic screw machine comprising a lower bed, an upper bed, a turret located between said beds, a shaft journaled in said upper bed above the turret, turret-indexing mechanism actuated by said shaft, and turret-locking mechanism actuated by said shaft.

11. An automatic screw machine comprising a lower bed, an upper bed spaced vertically from said lower bed, and rigid means interposed between said beds and rigidly securing them together.

12. An automatic screw machine comprising a lower bed, an upper bed spaced vertically from said lower bed, frames interposed between said beds and rigidly securing them together, and a turret journaled in certain of said frames and rotatable about an axis longitudinal of said beds.

13. An automatic screw machine comprising a lower bed, an upper bed spaced vertically from said lower bed, frames interposed between said beds and rigidly securing them together, a turret journaled in certain of said frames, a tool slide supported by and reciprocable on said lower bed, a feed shaft journaled in the upper bed, and operative mechanisms actuated by said feed shaft for reciprocating said tool slide, indexing the turret and locking the turret.

14. An automatic screw machine comprising two beds one spaced directly above the other, a feed shaft on the upper bed, a main tool slide on the lower bed, a frame interposed between the beds, a cross tool slide supported by said frame, and operative connections between the feed shaft and said slides.

15. An automatic screw machine comprising a bed, a cross slide movable transversely of the bed, a shaft arranged in a horizontal plane above the cross slide, and operative connections between said shaft and said cross slide.

16. An automatic screw machine comprising a bed, cross tool slides movable transversely of the bed, a cam shaft arranged in a horizontal plane above said slides and in a vertical longitudinal plane passing between said slides, and operative connections actuated by cams on said shaft for reciprocating said slides.

17. An automatic screw machine comprising a lower bed, an upper bed vertically spaced above said lower bed, a frame interposed between said beds, a cross tool slide mounted in guideways on said frame, a feed shaft journaled in said upper bed, and operative connections between said shaft and said cross slide.

18. An automatic screw machine comprising a lower bed, an upper bed spaced vertically therefrom, a frame interposed between said beds, a spindle-carrying turret journaled in said frame, a shaft journaled in said upper bed, and indexing mechanism for said turret actuated by said shaft.

19. An automatic screw machine comprising a lower bed, an upper bed vertically spaced therefrom, a turret and a tool slide located in the space between said beds, and a main cam shaft journaled in said upper bed and removable laterally of its axis therefrom.

20. An automatic screw machine comprising a lower bed, an upper bed vertically spaced therefrom, a turret and a tool slide located in the space between said beds, turret-locking mechanism for transmitting power to the tool slide to operate it, a cam shaft journaled in said upper bed, cams on said shaft for actuating said locking mechanism and said power-transmitting mechanism.

21. An automatic screw machine comprising a lower bed, an upper bed vertically spaced therefrom, a turret and a tool slide located in the space between said beds, a shaft journaled in said upper bed and removable laterally of its axis therefrom, and mechanisms actuated by said shaft for indexing and locking the turret and feeding said tool slide.

22. An automatic screw machine comprising a lower bed, an upper bed vertically spaced therefrom, a turret and a tool slide located in the space between said beds, a feed shaft journaled in said upper bed, variable-speed power-transmitting mechanism for driving said shaft at different speeds, and mechanisms actuated by said shaft for controlling said variable-speed power-transmitting mechanism, feeding said tool slide and indexing and locking said turret.

23. An automatic screw machine comprising a lower bed, an upper bed vertically spaced therefrom, and a plurality of frames interposed between said beds and rigidly securing them together.

24. An automatic screw machine comprising a lower bed, an upper bed vertically spaced therefrom, a plurality of frames interposed between said beds and rigidly securing them together, one of said frames being hollow with open upper and lower ends, a shaft journaled in said upper bed, a driving shaft supported by the lower bed, and power-transmitting connections between said shafts passing through said hollow frame.

25. An automatic screw machine comprising a lower bed, an upper bed vertically spaced therefrom, a plurality of frames interposed between said beds and rigidly securing them together, one of said frames being hollow with open upper and lower ends, a main drive shaft journaled in said upper bed, a motor supported by the lower bed, and power-transmitting connections between the motor shaft and the main drive shaft passing through said hollow frame.

26. An automatic screw machine comprising a lower bed, an upper bed vertically spaced therefrom, a plurality of frames interposed between said beds and rigidly securing them together, a spindle-carrying turret journaled in certain of said frames, a spindle drive shaft located between said beds in axial alinement with the turret, a main drive shaft journaled in said upper bed, and power-transmitting connections between said main drive shaft and said spindle-driving shaft.

27. An automatic screw machine comprising a lower bed, an upper bed vertically spaced therefrom, a plurality of frames interposed between said beds and rigidly securing them together, a spindle-carrying turret journaled in certain of said frames, a spindle drive shaft located between said beds in axial alinement with the turret, a main drive shaft journaled in said upper bed, power-transmitting connections between said main drive shaft and said spindle-driving shaft, a tool slide supported by the lower bed, a feed shaft journaled in the upper bed, and operative mechanism actuated by the feed shaft for reciprocating said tool slide.

28. An automatic screw machine comprising a lower bed, an upper bed vertically spaced therefrom, a plurality of frames interposed between said beds and rigidly securing them together, a spindle-carrying turret journaled in certain of said frames, a spindle drive shaft located between said beds in axial alinement with the turret, a main drive shaft journaled in said upper bed, power-transmitting connections between said main drive shaft and said spindle-driving shaft, a tool slide supported by the lower bed, a feed shaft journaled in the upper bed, operative mechanism actuated by the feed shaft for reciprocating said tool slide, and clutch-controlled power-transmitting mechanisms for transmitting power to the feed shaft in alternation from the spindle-driving shaft and the main drive shaft.

29. An automatic screw machine comprising a bed, a plurality of work-holding spindles, a spindle-carrying turret, means for rotating the spindles, a main tool slide, a cam shaft having a cam drum for causing the reciprocation of the main tool slide, and means for removably mounting said cam shaft to permit said shaft to be bodily removed transversely from the machine with the drum thereon.

30. An automatic screw machine comprising a lower bed, an upper bed spaced vertically therefrom, said upper bed having a plurality of transverse walls, a cam shaft journaled on said walls, and removable caps associated with said walls to coöperate therewith in journaling said shaft, the removal of said caps permitting the bodily transverse removal of said shaft from said machine.

31. An automatic screw machine comprising a bed, a flat horizontal main tool slide mounted to reciprocate longitudinally and horizontally thereon, a spindle-carrying turret supported by said bed, and spindles journaled in said turret and arranged to rotate bars of work, the said tool slide being in a horizontal plane lower than the lowest horizontal plane of the spindles, and arranged so that its end may slide under the work projecting from the spindles.

32. An automatic screw machine comprising a bed, a tool slide mounted to reciprocate thereon, a spindle-carrying turret supported by said bed, a feed shaft arranged in a horizontal plane above the horizontal planes of the turret, a worm wheel on the feed shaft, a worm shaft having a worm intermeshing with the worm wheel for rotating said shaft, and operative connections between said feed shaft and said tool slide.

33. In combination, spaced bearing frames, a turret having at its ends diametrically reduced journals mounted to rotate in bearings in said frames, one of said journals and the bearing in the associated frame being outwardly tapering and the other of said journals and the bearing in its associated frame being cylindrical.

34. An automatic screw machine comprising a lower bed, an upper bed, frames rigidly connecting said beds, a main tool slide mounted to reciprocate on the lower bed, a spindle-carrying turret journaled in certain of said frames, a feed shaft journaled on the upper bed, a vertical rock shaft pivoted to the upper and the lower beds and having lateral arms, a cam drum on the feed shaft for rocking one of said arms and thereby said rock shaft, and a link connecting the other arm to said main tool slide.

35. A multi-spindle metal-working machine comprising a bed, turret-bearing frames thereon, the forward one of said frames having a tapering socket, and a spindle-carrying turret journaled in said frames and having at its forward end a tapered portion complemental to said socket.

36. A multi-spindle metal-working machine comprising a bed, turret-bearing frames thereon, the forward one of said frames having a tapering socket, a spindle-carrying turret journaled in said frames and having at its forward end a tapered portion complemental to said socket, and means supported by the other frame for axially and forwardly adjusting said turret to force its tapered portion into the tapered socket.

37. A multi-spindle metal-working machine comprising a bed, turret-bearing frames thereon, the rear frame having a cylindrical bearing and the front frame having a forwardly tapered bearing, and a spindle-carrying turret having its rear end cylindrical complementally to the rear bearing and its front end tapered complementally to the front tapered bearing.

38. A multi-spindle metal-working machine comprising a bed, turret-bearing frames thereon, the rear frame having a cylindrical bearing and the front frame having a forwardly tapered bearing, a spindle-carrying turret having its rear end cylindrical complementally to the rear bearing and its front end tapered complementally to the front tapered bearing, and means on the rear frame for forwardly and axially adjusting said turret.

39. A multi-spindle metal-working machine comprising a bed, a tool slide thereon, a main casting secured upon said bed, a spindle-carrying turret journaled at its front end in said casting, a spaced bearing for the rear end of the turret, and a locking pin mounted in guides in said main casting for engaging and locking the front end of said turret to said main casting.

40. A multi-spindle metal-working machine comprising a bed, a tool slide thereon, a main casting secured upon said bed, a spindle-carrying turret having its front end journaled in said main casting and having a series of locking blocks in rear of and close to its front bearing, a spaced bearing frame for the rear end of said turret, and a locking pin mounted to slide in said main casting and successively to engage said locking blocks.

41. A multi-spindle metal-working machine comprising a bed, a tool slide thereon, a main casting secured upon said bed, a spindle-carrying turret journaled in said casting, said main casting having alined guides above and below the horizontal planes of the spindles, cross tool slides mounted to slide transversely of the bed on said main casting and arranged on both sides of the median vertical plane of the bed, a cam shaft, and rock shafts actuated thereby for reciprocating said cross slides.

42. A multi-spindle metal-working machine comprising a bed, a tool slide thereon, a main casting secured upon said bed, a spindle-carrying turret journaled in said main casting, a locking pin mounted in guides in said main casting for locking said turret to said main casting, guides on said main casting spaced above and below the horizontal planes of the work spindles, and an upright cross tool slide mounted to slide in said guides transversely of the bed on said main casting.

43. A multi-spindle metal-working machine comprising a bed, a tool slide thereon, a main casting secured upon said bed, a spindle-carrying turret journaled in said main casting, said main casting having a transverse vertical guideway on its front end with its upper and lower guides in horizontal planes above and below the horizontal planes of the spindles, and a vertical cross slide mounted in said guideway and held at its upper and lower sides against lateral movement.

44. A multi-spindle metal-working machine comprising a bed, a spindle-carrying turret supported thereon and having a series of locking blocks, a locking pin arranged successively to engage said blocks, a cam shaft, a cam thereon and a lever actuated thereby for disengaging said locking pin from a block, and a second cam on said shaft arranged directly to engage said pin and hold it in engagement with a block.

45. A multi-spindle metal-working machine comprising a bed, a spindle-carrying turret supported thereon and having a series of locking blocks, a cam shaft arranged in a horizontal plane above the axis of said turret, a slidable locking pin to engage said blocks successively, a cam on said shaft arranged to engage the end of said pin and force it into engagement with a block, a second cam on said shaft, and a lever actuated thereby for sliding said pin out of engagement with a block.

46. A multi-spindle metal-working machine comprising a bed, a plurality of spaced upright frames thereon arranged in longitudinal alinement, a spindle-carrying turret journaled in the front frames, a main tool slide arranged to slide longitudinally of the bed in guides below the horizontal planes of the spindles, a turret extension journaled in the rear frame and including a disk, and mechanism associated with said disk for rotating said disk and thereby indexing the turret.

47. A multi-spindle metal-working machine comprising a bed, a plurality of spaced upright frames thereon arranged in longitudinal alinement, a spindle-carrying turret journaled in the front frames, a turret extension journaled in the rear frame and including a disk, mechanism associated with said disk for indexing the turret, and turret-locking mechanism associated with the front end of the turret for locking it after it has been indexed.

48. A multi-spindle metal-working machine comprising a bed, a plurality of spaced upright frames thereon arranged in longitudinal alinement, a spindle-carrying turret journaled in the front frames, a disk journaled in the rear frame, a turret journaled in the front frame, a shaft rotatively connecting said disk and said turret, a turret-indexing mechanism associated with said disk, and turret-locking mechanism associated with said turret.

49. A multi-spindle metal-working machine comprising a bed, and a hollow turret thereon consisting of end disks and spaced parallel bars connecting the rim portions of said end disks.

50. A multi-spindle metal-working machine comprising a bed, a hollow turret consisting of a single casting comprising end disks and spaced parallel bars connecting the rim portions of said disks, and spaced bearings on the bed in which said disks are journaled.

51. A multi-spindle metal-working machine comprising a bed, a hollow turret consisting of end disks and spaced parallel bars connecting the rim portions of said disks, said disks having radially reduced end portions, and bearings on said bed in which said end portions are journaled.

52. A multi-spindle metal-working machine comprising a bed, a hollow turret comprising in one integral structure journals at the ends thereof and an intermediate or body portion which is greater in diameter than said journals, and bearings on said bed in which said journals are rotatively mounted.

53. A multi-spindle metal-working machine comprising a bed, separable frames thereon provided with bearings, a work-spindle-carrying turret having journals at its ends mounted in said bearings, and having an intermediate or body portion which is materially greater in diameter than said journals, and which is provided with lateral openings, work spindles journaled in the ends of the turret, and gears on said spindles removable through said openings when said spindles are dismounted.

54. A multi-spindle metal-working machine comprising a bed, bearings supported by said bed, and a turret consisting of disks having reduced journals mounted in said bearings, and spaced parallel bars connecting the rim portions of said disks, said turret between said bearings being materially greater in diameter than said journals.

55. A multi-spindle metal-working machine comprising a bed, a hollow turret consisting of end disks and spaced parallel bars connecting the rim portions of said disks, said disks having radially reduced end portions, and bearings on said bed in which said end portions are journaled, the front end disk of said turret having locking blocks projecting radially beyond the reduced end thereof.

56. A multi-spindle metal-working machine comprising a bed, a hollow turret thereon consisting of reduced end disks and spaced parallel bars connecting the rim portions of said end disks, a turret bearing consisting of separable frames secured on the bed, a plurality of spindles journaled in said disks and having gears thereon located between said disks, a spindle-driving shaft axially alined with the turret and projecting through the front end disk, and a gear thereon meshing with the gears on the spindles.

57. A multi-spindle metal-working machine comprising a turret consisting of a single casting having end disks and rigid connections between them, a turret bearing consisting of separable frames, spindles journaled in said disks and having chuck-operating collars on the rear ends thereof, a separable disk in the rear of said collars, a shaft alined axially with said turret and connecting said disk to said turret, and turret-indexing mechanism associated with said last-mentioned disk.

58. A multi-spindle metal-working machine comprising a turret consisting of end disks and rigid connections between them, spindles journaled in said disks and having chuck-operating collars on the rear ends thereof and also having stock-feeding spools projected from the rear ends thereof, a disk arranged between said collars and said spools, a shaft alined with the turret and connecting said disk thereto, turret-indexing mechanism associated with said last-mentioned disk, mechanism associated with said collars for actuating them, and mechanism for actuating said spools.

59. A metal-working machine comprising a bed, a spindle-carrying turret supported thereon and extending longitudinally thereof, and a chip receptacle located beneath the bed and having an open end at the end of the bed, there being an unobstructed space between said receptacle and the bed for the passage of the chips and cuttings removed from the work by the tools.

60. A metal-working machine comprising a bed, a spindle-carrying turret supported thereon and extending longitudinally thereof, a tool slide on the bed and movable toward and from the turret, a chip receptacle beneath the bed and disposed to receive the chips, said receptacle having front, rear and inner end walls and having an open end under the end of the bed.

61. A metal-working machine comprising a bed adapted to support a turret and a main tool slide and having an opening for the passage of chips and cuttings, standards supporting said bed, and a chip receptacle supported beneath the opening in the bed by one of said standards to receive the work chips and having an open mouth for the discharge of the chips, there being an unobstructed space between said receptacle and the bed for the passage of the chips and cuttings removed from the work by the tools.

62. An automatic screw machine comprising a bed, a spindle-carrying turret supported on the bed, a main casting in which the front end of the turret is journaled, a main tool slide movable toward and from the turret, said casting being formed with a vertical guideway arranged transversely of the bed and having upper and lower guides, a vertical cross slide slidable in said guideway and having provisions for tools to operate on the pieces of work in a plurality of spindles.

63. An automatic screw machine comprising a bed, a main tool slide arranged to reciprocate longitudinally thereof, a rotary turret having four spindles which, when the turret is locked, are arranged two in rear and two in front of the vertical plane of the turret axis, vertical cross slides arranged in front and in rear of said plane, guides on said bed for guiding the upper and lower edges of the slides, provisions for securing tools on each slide to operate on the work held by the two adjacent spindles, a cam shaft arranged in a horizontal plane above the turret, and mechanism actuated thereby for reciprocating said cross slide.

64. An automatic screw machine comprising a bed, a main tool slide arranged to reciprocate longitudinally thereof, a rotary turret having four spindles which, when the turret is locked, are arranged two in rear and two in front of the vertical plane of the turret axis, vertical cross slides arranged in front and in rear of said plane, guides on said bed for guiding the upper and lower edges of the slides, provisions for securing tools on each slide to operate on the work held by the two adjacent spindles, and a cam shaft disposed above the turret in axial parallelism therewith, cams thereon, and cam-operated rock shafts for actuating said cross slides.

65. An automatic screw machine comprising a bed, a main tool slide arranged to reciprocate longitudinally thereof, a rotary turret having four spindles which, when the turret is locked, are arranged two in rear and two in front of the vertical plane of the turret axis, vertical cross slides arranged in front and in rear of said plane, a main casting on the bed furnishing a bearing for the turret and having vertical guideways to receive the cross slides to guide them horizontally and transversely of the turret, a turret-locking bolt supported by said main casting, and mechanism for actuating said slides.

66. An automatic screw machine comprising a bed, a spindle-carrying turret thereon, a main tool slide on the bed and having its top face disposed in a horizontal plane below the turret spindles, tools on said slide for operating simultaneously on all the pieces of work carried by the spindles, a main casting affording a bearing for the front end of the turret and cross-slide guideways, vertically arranged cross slides in said guideways, and tools on said cross slides for operating on all the pieces of work while the turret is locked.

67. An automatic screw machine comprising a bed, a spindle-carrying turret, a cross tool slide, an upright rock shaft having an arm arranged to reciprocate said slide, a cam shaft extending longitudinally of the turret axis, and cam-operated means for rocking said shaft.

68. An automatic screw machine comprising a bed, a spindle-carrying turret, a cross tool slide, an upright rock shaft having an arm arranged to reciprocate said slide, a cam shaft extending longitudinally of the turret axis and located thereabove, a cam on said shaft, a cam-actuated slide, and a second arm on said rock shaft connected to said slide.

69. An automatic screw machine comprising a bed, a spindle-carrying turret, a cross tool slide, an upright rock shaft having an arm arranged to reciprocate said slide, a cam shaft extending longitudinally of the turret axis and located thereabove, a cam on said shaft, a cam-actuated slide parallel with said shaft, common means for supporting said slide and journaling said cam shaft in close proximity, a second arm on said rock shaft, and a pin and slot connection between said last-mentioned arm and said slide.

70. An automatic screw machine comprising a turret, spindles journaled therein, a tool slide, a stock-feeding mechanism, and a yielding operative connection between said stock-feeding mechanism and said tool slide.

71. An automatic screw machine comprising a turret, spindles journaled therein, a main tool slide movable longitudinally of and toward and from the turret, a cross tool slide, stock-feeding mechanism, and a yielding operative connection between said main tool slide and said stock-feeding mechanism.

72. An automatic screw machine comprising a turret, spindles journaled therein and having stock-feeding spools, a slide having an arm arranged successively to engage said spools, a tool slide, and yielding means connecting said tool slide and said first-mentioned slide.

73. An automatic screw machine comprising a turret, spindles journaled therein and having stock-feeding spools, a slide having an arm arranged successively to engage said spools, a tool slide, a rock shaft having an arm connected to the tool slide to operate it, and yielding means connecting said arm to said first-mentioned slide.

74. An automatic screw machine comprising a rotatory turret, a plurality of work-carrying spindles, stock-feeding mechanism arranged to feed the work through the spindles, a cross tool slide, and a stock stop actuated by said cross slide.

75. An automatic screw machine comprising a rotary turret, a plurality of work-carrying spindles, stock-feeding mechanism arranged to feed the work through the spindles, a cross tool slide, a stock stop arm, and means connecting said arm to said cross slide whereby said stock stop arm is actuated by said slide.

76. An automatic screw machine comprising a bed, a spindle-carrying turret thereon, a main tool slide, and mechanisms for indexing and locking said turret and feeding said main slide all located above the horizontal planes of the bed.

77. An automatic screw machine comprising a bed, a main tool slide thereon, a turret, work spindles journaled therein, a spindle-driving shaft, a cam shaft which controls the operation of the machine, a main drive shaft, and trains of gears for driving the cam shaft and the spindle-driving shaft from the main drive shaft, and driving the cam shaft from the spindle-driving shaft located outside the end of the bed and including change gears.

78. An automatic screw machine comprising a main tool slide, a cam shaft for actuating said slide, a worm wheel on said shaft, a worm shaft arranged transversely of said cam shaft and movable lengthwise, a worm splined on said shaft in engagement with said worm wheel and held against axial movement, separable gears of which one is mounted on the worm shaft for driving said shaft, and means for moving said worm shaft for separating said gears.

79. An automatic screw machine comprising a main tool slide, a cam shaft for actuating said slide, a worm wheel on said shaft, a worm shaft arranged transversely of said cam shaft and movable lengthwise, a worm splined on said shaft in engagement with said worm wheel and held against axial movement, separable gears of which one is mounted on the worm shaft for driving said shaft, a rock shaft having means engaging said worm shaft for moving it axially to separate and to engage said gears, and a handle on the rock shaft.

80. An automatic screw machine comprising a bed, a plurality of frames thereon, a turret journaled in said frames and comprising an indexing extension journaled in the end frame, and removable covers between said frames to inclose the turret.

81. An automatic screw machine comprising a driven shaft at the top of the machine, a motor having a driving shaft supported below the bed, power-transmitting means between said shafts, and a bed structure supporting said shafts and having a hollow vertical box inclosing said power-transmitting means.

In testimony whereof I have affixed my signature.

FRANK L. CONE.